(12) United States Patent
Hino

(10) Patent No.: US 8,052,568 B2
(45) Date of Patent: Nov. 8, 2011

(54) BICYCLE HUB TRANSMISSION

(75) Inventor: Tetsuya Hino, Osaka (JP)

(73) Assignee: Shimano Inc., Osaka (JP)

(*) Notice: Subject to any disclaimer, the term of this patent is extended or adjusted under 35 U.S.C. 154(b) by 851 days.

(21) Appl. No.: 12/103,083

(22) Filed: Apr. 15, 2008

(65) Prior Publication Data
US 2009/0023542 A1 Jan. 22, 2009

(30) Foreign Application Priority Data
Jul. 18, 2007 (EP) .................................. 07014097

(51) Int. Cl.
*F16H 3/44* (2006.01)
*F16H 48/00* (2006.01)
(52) U.S. Cl. .......... 475/297; 475/270; 475/294; 475/12
(58) Field of Classification Search .............. 475/12, 475/269, 270, 294, 296, 297, 330
See application file for complete search history.

(56) References Cited

U.S. PATENT DOCUMENTS

| | | | | |
|---|---|---|---|---|
| 5,273,500 A | * | 12/1993 | Nagano | 475/312 |
| 5,322,487 A | * | 6/1994 | Nagano | 475/297 |
| 5,527,230 A | * | 6/1996 | Meier-Burkamp | 475/275 |
| 5,562,563 A | * | 10/1996 | Shoge | 475/298 |
| 5,967,937 A | * | 10/1999 | Matsuo | 475/297 |
| 6,048,287 A | | 4/2000 | Rohloff | |
| 6,258,005 B1 | | 7/2001 | Rohloff | |
| 6,533,700 B2 | | 3/2003 | Shoge | |
| 6,572,508 B2 | | 6/2003 | Shoge | |
| 6,607,465 B1 | | 8/2003 | Shoge | |
| 6,641,500 B2 | | 11/2003 | Shoge | |
| 6,875,150 B2 | | 4/2005 | Matsuo et al. | |
| 7,670,251 B2 | * | 3/2010 | Okochi | 475/297 |
| 2005/0197230 A1 | | 9/2005 | Steuer et al. | |
| 2005/0252750 A1 | * | 11/2005 | Matsueda et al. | 192/217.4 |

FOREIGN PATENT DOCUMENTS

| | | |
|---|---|---|
| DE | 43 42 347 C1 | 2/1995 |
| DE | 197 45 419 A1 | 4/1998 |
| DE | 197 20 796 A1 | 11/1998 |
| DE | 10 2004 011 052 A1 | 9/2005 |
| EP | 1 167 175 A1 | 1/2002 |
| GB | 738338 | 10/1955 |
| JP | 05288248 A * | 11/1993 |
| WO | WO-01/92094 A1 | 12/2001 |

OTHER PUBLICATIONS

English translation of DE19745419A, May 10, 2011, http://translationgateway.epo.org.*

* cited by examiner

*Primary Examiner* — Roger Pang
(74) *Attorney, Agent, or Firm* — Global IP Counselors, LLP

(57) ABSTRACT

A bicycle hub transmission includes a hub axle, a driver, a hub shell, a power transmission mechanism and a shift mechanism. The driver and the hub shell are rotatably supported relative to the hub axle. The power transmission mechanism is disposed between the driver and the hub shell to selectively transmit rotational power from the driver to the hub shell through one a plurality of power transmission paths. The shift mechanism operatively couples the power transmission mechanism to select a power transmission path. The downstream planetary gear unit includes a planetary gear carrier that meshes with planetary gears of the upstream planetary gear unit or with a linking member coupled to the planetary gears of the upstream planetary gear unit. The planetary gear carrier of the downstream planetary gear unit is coupled with a brake unit to transmit a reverse rotational power from the driver to the brake unit.

22 Claims, 17 Drawing Sheets

BICYCLE HUB TRANSMISSION

CROSS-REFERENCE TO RELATED APPLICATIONS

This application claims priority under 35 U.S.C. §119 to European Patent Application No. 07012817.8, filed Jun. 29, 2007. The entire disclosure of European Patent Application No. 07012817.8 is hereby incorporated herein by reference.

BACKGROUND OF THE INVENTION

1. Field of the Invention

This invention generally relates to a hub transmission for a bicycle. More specifically, the present invention relates to an internally geared bicycle hub transmission.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle drive train.

Internally mounted multi-speed hub transmissions are mounted to the rear wheel of a bicycle and allow a rider of the bicycle to select different gear ratios to change the pedaling force. Typically a hub transmission has a hub axle that is mounted to the bicycle frame. The hub axle rotatably supports a driver for transmitting a pedaling force to the hub transmission through a sprocket and a chain. The hub transmission further comprises a hub shell which is likewise rotatably supported by the hub axle.

The hub shell accommodates a power transmission mechanism which is disposed between the driver and the hub shell for transmitting rotational power from the driver to the hub shell. The power transmission mechanism provides a plurality of power transmission paths with different gear ratios that can be selected by using a shift mechanism, wherein each power transmission path typically produces a specific gear ratio. To establish the plurality of power transmission paths the power transmission mechanism ordinarily has several planetary gear mechanisms.

Current internal hub transmissions are designed to provide 10 or more speed stages. For example, one proposed internal hub transmission is disclosed in German Patent Publication No. DE 10 2004 011 052 A1. The hub transmission according to German Patent Publication No. DE 10 2004 011 052 A1 allows a selection between 9 speed stages which are provided by a plurality of planetary gear mechanisms. The known hub transmission has three planetary gear mechanisms that allow the combination of three speed stages with another five speed stages, for a total of nine speed stages with a gear ratio of 340%. The hub transmission includes a first planetary gear mechanism having a first sun gear that is non-rotatably mounted to the hub axle, a first planetary gear rotatably supported by a first planetary gear carrier and a first ring gear. The first planetary gears are disposed between the first sun gear and the first ring gear and mesh with the same.

A second planetary gear mechanism includes a second sun gear which is arranged on the first planetary gear carrier. Second planetary gears are mounted on the first ring gear. A third planetary gear mechanism is formed similar to the second planetary gear mechanism, and includes a third sun gear mounted on the first planetary gear carrier. The third sun gear meshes with third planetary gears with each being non-rotatably joined to the respective second planetary gears. Thereby a two-step planetary gear is formed. The third planetary gears mesh with a second ring gear to transmit the torque of the third planetary gear mechanism to the second planetary gear mechanism.

The shifting mechanism of this hub transmission comprises a pawl carrier which allows coupling the driver selectively with components of the respective planetary gear mechanisms to produce different gear ratios. To this end the pawl carrier comprises a plurality of controllable pawls, namely six pawls that are actuated by means of three shifting cams.

The arrangement of the two-step planetary gear on the first ring gear in combination with the second ring gear that meshes with the two-step planetary gears, leads to a pile type of internal hub transmission. Since the second ring gear overlaps the other components of the three planetary gear mechanisms, the diameter of the second ring gear and, thus, the diameter of the internal hub transmission is increased. Moreover, the pile type construction of the internal hub transmission leads to an increased total weight of the hub.

As described above, the second and third sun gears are each mounted on the first planetary gear carrier. Therefore, the second and third sun gears each rotate together with the first planetary gear carrier around the hub axle. In particular, the power transmission path for speed stages 8 and 9 comprises the driver, the sixth pawl and the first planetary gear carrier wherein the first planetary gears rotate around the first sun gear. The power transmission path further has the first ring gear, the second ring gear, the first pawl, the pawl connecting the power transmission with the hub shell and the hub shell. In speed stage 8, the third planetary gear rotates around the third sun gear and in speed stage 9 the second planetary gear rotates around the second sun gear.

Due to this differential rotational type of the planetary gear mechanism the power transmission paths are complicated. In particular the power transmission paths for speed stages 8 and 9 inefficiently transmit power.

A similar hub transmission is known from German Patent Publication No. DE 197 20 796 A1, which discloses a multiple speed hub having a plurality of planetary gear mechanisms arranged in series. The hub transmission disclosed therein enables either a 7 speed shifting or a 14 speed shifting. The 14 speed hub transmission comprises five planetary gear mechanisms, the components of which can be selectively locked to establish the desired power transmission paths. A first planetary gear mechanism comprises a first sun gear rotatably supported by a hub axle which can be locked with the same. The first sun gear meshes with the smaller diameter of a two-step planetary gear which is rotatably supported by a first planetary gear carrier. The first planetary gear carrier is non-rotatably connected with the hub shell. The large diameter of the two-step planetary gear meshes with a ring gear that can be locked either with the hub axle or the first sun gear. A second planetary gear mechanism comprises a second sun gear rotatably supported by and lockable with the hub axle. Second planetary gears mesh with the sun gear and a second ring gear wherein the second ring gear is non-rotatably connected with the first sun gear. A third planetary gear mechanism comprises a third sun gear which is rotatably supported by and lockable with the hub axle. Third planetary gears mesh with the third sun gears which are non-rotatably connected with the second planetary gears with the respective second planetary gears. The second sun gear meshes with the small diameter stage of the stepped planetary gears, and the third sun gear meshes with the large diameter stage of the stepped planetary gears.

The fourth and fifth planetary gear mechanisms are similar to the second and third planetary gear mechanisms and are symmetrically formed and arranged. The fourth and fifth planetary gear mechanisms therefore likewise comprise two-stage planetary gears, wherein the planetary gears of the second and third planetary gear mechanism and the planetary gears of the fourth and fifth planetary gear mechanisms are rotatably supported by means of a common planetary gear carrier. The small diameter stage of the stepped planetary gears of the fourth and fifth planetary gear mechanisms mesh with a ring gear that is non-rotatably connected with a driver.

A further embodiment of the 14-speed hub transmission is based on a modified embodiment of the above described hub transmission, and has a second ring gear which meshes with both small diameter stages of the symmetrically arranged stepped planetary gears. The common planetary gear carrier is replaced with two separate planetary gear carriers with the planetary gear carrier of the second and third planetary gear mechanisms being non-rotatably connected with the first sun gear. The planetary gear carrier of the fourth and fifth planetary gear mechanisms is non-rotatably connected with the driver.

Owing to the increased number of clutches required for locking the separate components of the planetary gear mechanisms, for example the ring gears with the sun gears, the hub transmission according to German Patent Publication No. DE 197 20 796 A1 is complicated and comparatively expensive.

In view of the above, it will be apparent to those skilled in the art from this disclosure that there exists a need for an improved bicycle hub transmission. This invention addresses this need in the art as well as other needs, which will become apparent to those skilled in the art from this disclosure.

SUMMARY OF THE INVENTION

One object of the invention to provide a hub transmission for a bicycle comprising a plurality of speed stages and enabling a lightweight and compact construction.

The foregoing objects can basically be attained by providing a bicycle hub transmission that basically comprises a hub axle, a driver, a hub shell, a planetary gear mechanism and a clutch. The driver is rotatably supported relative to the hub axle. The hub shell is rotatably supported relative to the driver. The power transmission mechanism includes a downstream planetary gear unit and an upstream planetary gear unit disposed between the driver and the hub shell to selectively transmit rotational power from the driver to the hub shell through one a plurality of power transmission paths. The shift mechanism is operatively coupled to the power transmission mechanism to select one of the power transmission paths. The downstream planetary gear unit includes a planetary gear carrier that meshes with planetary gears of the upstream planetary gear unit or with a linking member, which is coupled to the planetary gears of the upstream planetary gear unit. The planetary gear carrier of the downstream planetary gear unit is coupled with a brake unit to transmit a reverse rotational power from the driver to the brake unit.

A hub transmission structure with an integrated brake unit is known, for example, from EP 06 008 957 which is assigned to Shimano, Inc. However, the known hub transmissions lack the specific coupling of the downstream planetary gear carrier with the upstream planetary gear carrier or with the linking member wherein the brake unit is coupled with the downstream planetary gear carrier.

A hub transmission formed in accordance with the invention has a number of advantages. Since the planetary gear carrier of the downstream planetary gear unit meshes with planetary gears of the upstream planetary gear unit a compact design is achieved that allows for a plurality of power transmission paths while maintaining a small diameter of the hub. The aforementioned coupling of the downstream planetary gear carrier with upstream planetary gears further allows realizing the plurality of power transmission paths by means of a comparatively simple structure that reduces the risk of a failure of components of the transmission. Due to the surprisingly simple structure of the inventive hub transmission it is possible to produce a hub transmission that enables a comparatively great number of gear ratios at relatively low costs. The invention has the further advantage that the planetary gear carrier of the downstream planetary gear unit can be coupled with a brake unit to provide a hub transmission with an integrated brake.

In a preferred embodiment, the bicycle hub transmission has the downstream planetary gear unit and the upstream planetary gear unit arranged to form at least four planetary gear mechanisms arranged in series. Thereby it is possible to realize an 11-speed hub transmission with a compact design and a relatively small hub diameter.

Preferably, the downstream planetary gear unit constitutes at least a first planetary gear mechanism and the upstream planetary gear unit constitutes at least second, third and fourth planetary gear mechanisms The first planetary gear mechanism preferably includes the planetary gear carrier of the downstream planetary gear unit and the third gear mechanism includes the planetary gears of the upstream planetary gear unit. This means that the first and third planetary gear mechanisms are coupled by means of the downstream or first planetary gear mechanism which meshes with the upstream or third planetary gears.

Preferably, the planetary gear carrier of the downstream planetary gear unit includes a carrier portion and a ring gear portion which meshes with the planetary gears of the upstream planetary gear unit or with the linking member which is coupled with the planetary gears of the upstream planetary gear mechanism, with the carrier portion and the ring gear portion being non-rotatably connected as a unit. Hence, it is to be emphasised that the planetary gear carrier of the downstream planetary gear unit fulfils two functions, namely a support function for the planetary gears of the first planetary gear mechanism and a power transmission function for the planetary gears of the upstream planetary gear unit. Due to the non-rotatable connection between the carrier portion and the ring gear portion the compact design of the hub transmission is optimized.

Moreover, it is possible to directly mesh the ring gear portion with the planetary gears of the upstream planetary gear unit or alternatively to provide, a linking member as an intermediate component between the upstream planetary gear unit and the ring gear portion, which is coupled with the planetary gears of the upstream planetary gear mechanism. Thereby, it is possible to use different braking clutch means with the aforementioned embodiments.

Preferably, the planetary gear carrier of the downstream planetary gear unit is selectively connectable with the fourth planetary gear mechanism. Thereby, a number of further power transmission paths can be realized.

The connection of the planetary gear carrier and the downstream planetary gear unit with the fourth planetary gear mechanism can be realized, for example, by means of a preferred embodiment wherein the planetary gear carrier of the downstream planetary gear unit includes a clutch engaging portion which is selectively connectable with a planetary gear carrier of the fourth planetary gear mechanism.

To enable a transmission of a rotational force from the planetary gear carrier of the downstream planetary gear unit to the hub shell, the planetary gear carrier of the downstream planetary gear unit is selectively connectable with the hub shell by a first clutch to transmit a rotational force from the planetary gear carrier to the hub shell.

In a preferred embodiment, the first planetary gear mechanism includes the first sun gear, a first ring gear and a plurality of first planetary gears, with the first sun gear being rotatably supported by the hub axle and selectively lockable with the hub axle, the first ring gear being coaxially arranged with the first sun gear, and the first planetary gears meshing with the first sun gear and the first ring gear, the first planetary gears being rotatably supported by the planetary gear carrier of the first planetary gear mechanism. The first planetary gear mechanism corresponds to the downstream planetary gear unit.

Preferably, the first ring gear is selectively connectable with the hub shell by a second clutch for transmitting a rotational force from the first ring gear to the hub shell.

Preferably, the second planetary gear mechanism includes a second sun gear, a second planetary gear carrier and a plurality of second planetary gears, with the second sun gear being rotatably supported by the hub axle and selectively lockable with the hub axle, the second planetary gear carrier being rotatably supported by the second planetary gear carrier and meshing with the second sun gear.

Preferably, the third planetary gear mechanism includes a third sun gear rotatably supported by the hub axle and selectively lockable with the hub axle, with the planetary gears being rotatably supported by the second planetary gear carrier and meshed with the third sun gear.

Preferably, the planetary gear carrier of the third planetary gear mechanism and the second planetary gears of the second planetary gear mechanism are non-rotatably connected as a unit to form stepped planetary gears respectively.

In a further preferred embodiment, the fourth planetary gear mechanism includes a fourth sun gear, a second ring gear and a plurality of fourth planetary gears, with the fourth sun gear being non-rotatably fixed to the hub axle, the second ring gear being coaxially arranged with the fourth sun gear, and the fourth planetary gears being rotatably supported by a third planetary gear carrier and meshing with the fourth sun gear and the second ring gear.

Preferably, the third planetary gear carrier engages with the second planetary gear carrier.

Preferably, a third clutch is disposed between the third planetary gear carrier and the first planetary gear carrier, with clutch engaging portion arranged to selectively transmit a rotational force from the third planetary gear carrier to the first planetary gear carrier. A fourth clutch can be disposed between the driver and the second ring gear to selectively transmit a rotational force from the driver to the second ring gear. A fifth clutch may be disposed between the driver and the third planetary gear carrier to selectively transmit a rotational force from the driver to the third planetary gear carrier.

In a further preferred embodiment, the brake unit includes a cup which is non-rotatably connected with the hub shell and forms a circumferentially disposed braking surface. The brake unit further includes a plurality of brake elements arranged to co-operate with the braking surface to apply a braking torque, and a plurality of control elements to actuate the brake elements. The control elements are coupled with the planetary gear carrier of the downstream planetary gear unit such that an actuation of the brake elements is effected by a reverse rotation of the planetary gear carrier of the downstream planetary gear unit. This embodiment provides a reliable and compact brake unit which is coupled with the planetary gear carrier of the downstream planetary gear unit to actuate the brake unit. As the planetary gear carrier of the downstream planetary gear unit operatively connects the brake unit with the upstream planetary gear mechanism an optimal transmission of the reverse rotational force from the driver to the brake unit is accomplished.

The first clutch can be disposed between the cup and the planetary gear carrier of the downstream planetary gear unit. Thereby it is possible to transmit a forward rotational force from the planetary gear carrier of the downstream planetary gear to the hub shell via the cup which is non-rotatably connected with the hub shell. This arrangement allows to reduce the length of the hub transmission and improves the compact design thereof.

The first clutch can be supported by a retaining element for the control elements. This embodiment further minimizes the space used for the brake unit.

In a further embodiment, the control elements comprise a plurality of rollers which cooperate with a plurality of cam surfaces provided on the planetary gear carrier on the downstream planetary gear. The retaining element comprises a roller cage supporting the rollers wherein the roller cage is engaged with the planetary gear carrier of the downstream planetary gear unit. The engagement of the roller cage with the planetary gear carrier of the downstream planetary gear unit enables a simple and efficient actuation of the brake units if the planetary gear carrier is rotated in a reverse direction and, thus, also the roller cage. Thereby, the rollers contained in the roller cage cooperate with the cam surfaces such that the rollers push the brake elements against the braking surface for applying a braking torque.

Preferably, the fourth clutch can be disposed between the driver and the second ring gear and includes a plurality of driving pawls and a plurality of braking pawls which are adapted to be selectively activated by a forward or reverse rotation of the driver to rotate the second ring gear in a forward or reverse direction.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
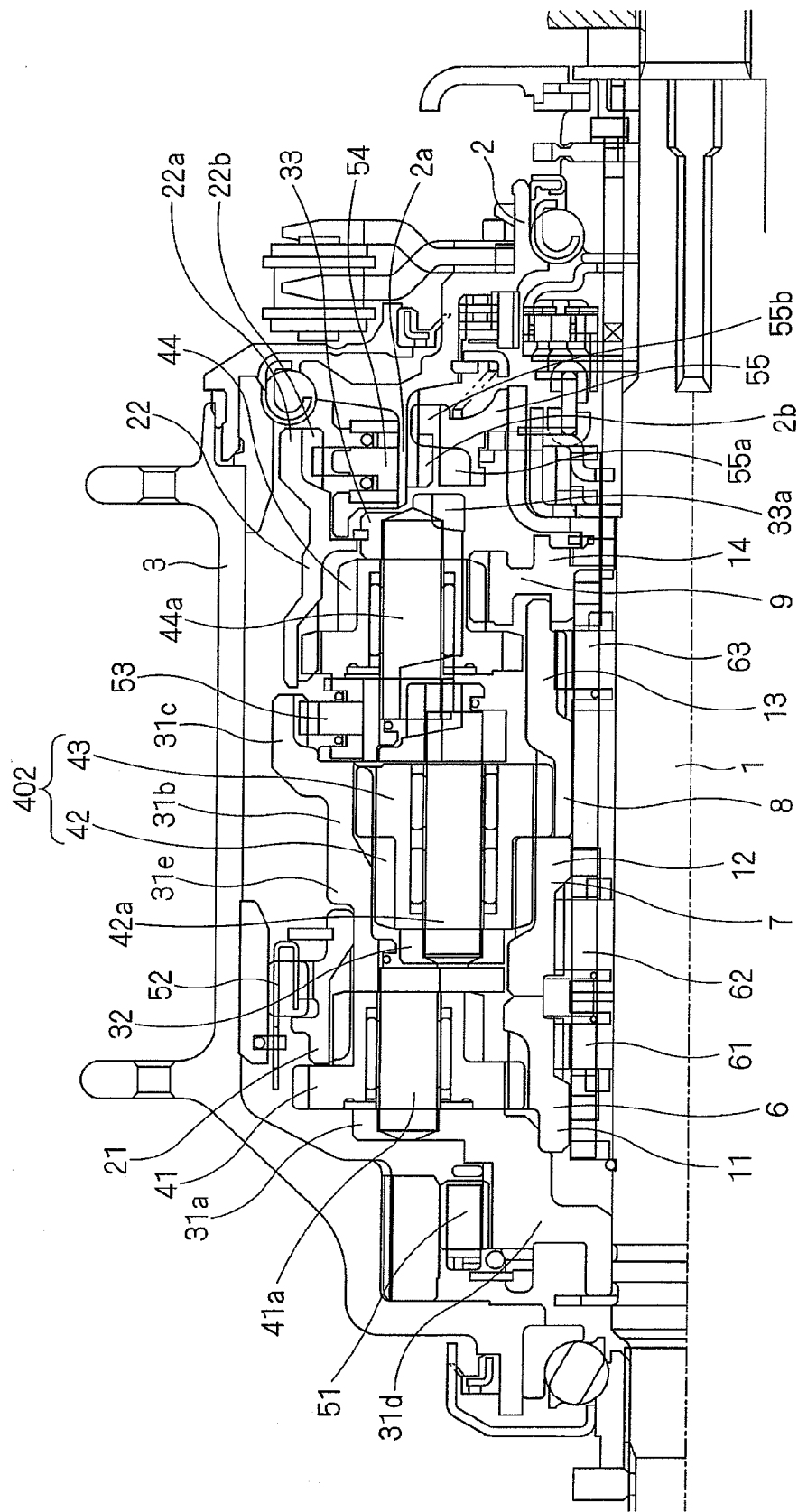
FIG. 1 is a longitudinal cross-sectional view of a hub transmission according to an illustrated embodiment.
Figure 2:
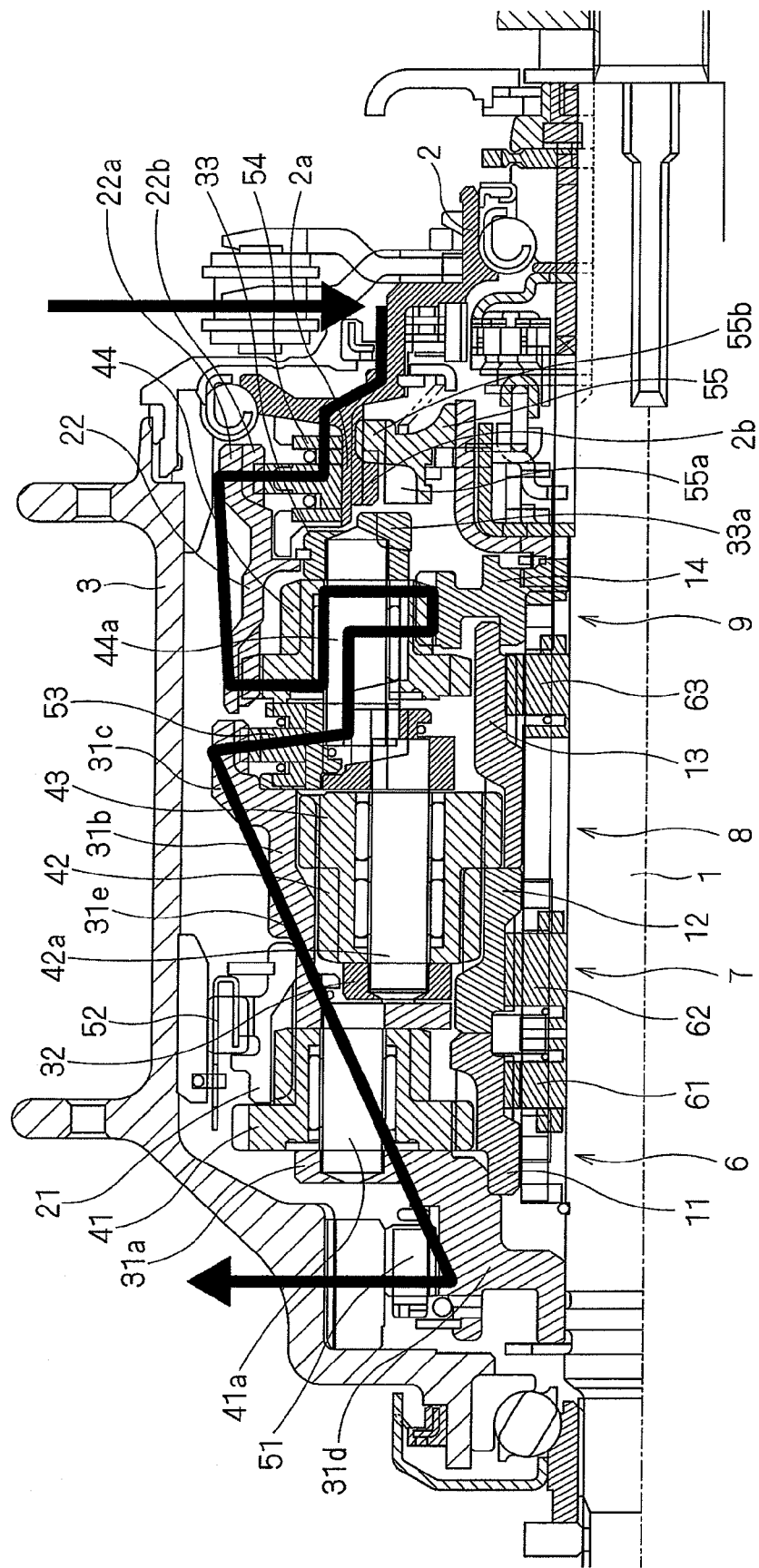
FIG. 2 is a longitudinal cross-sectional view of the hub transmission according to FIG. 1 in speed stage 1.
Figure 3:
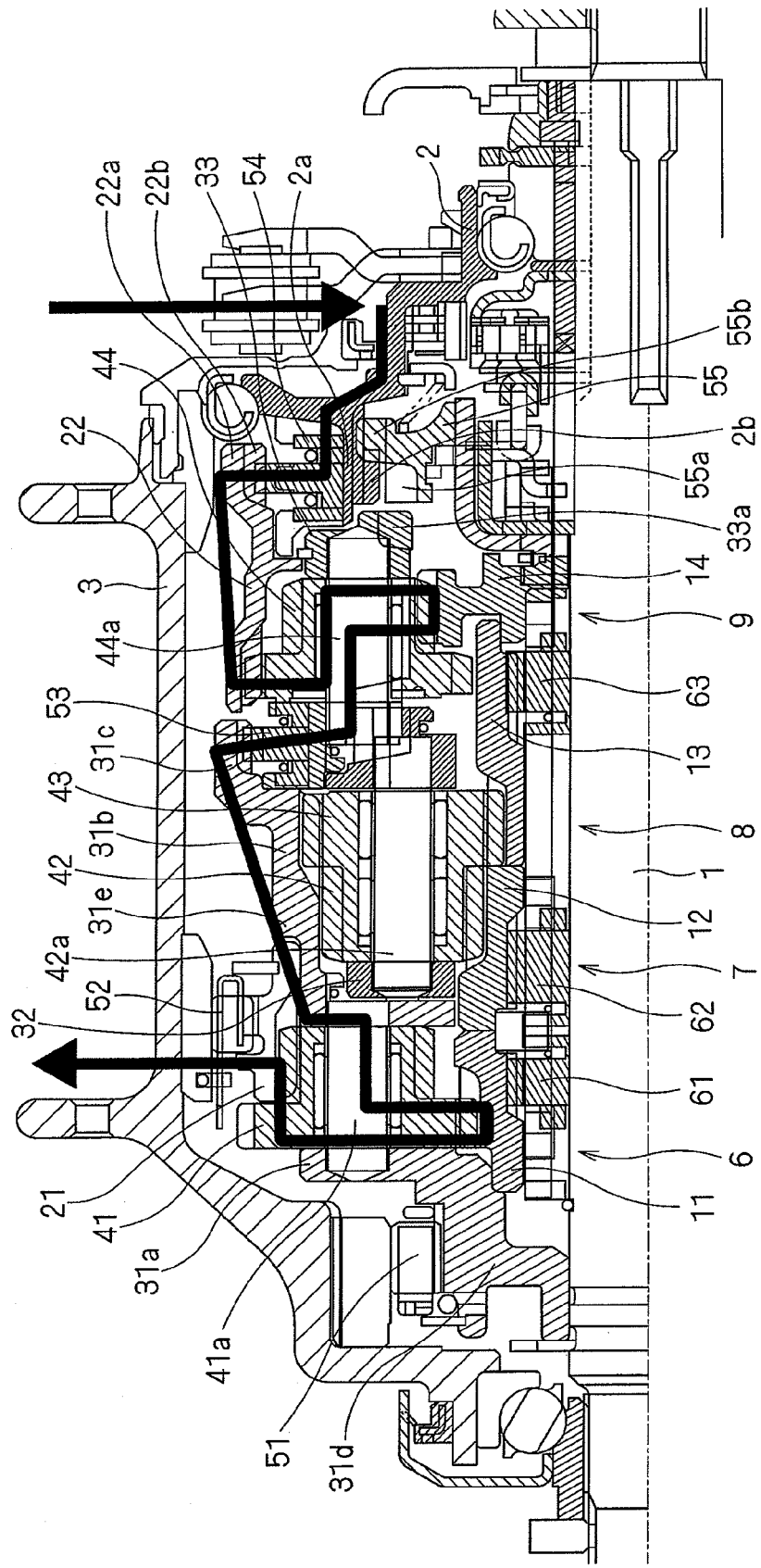
FIG. 3 is a longitudinal cross-sectional view of the hub transmission according to FIG. 1 in speed stage 2.
Figure 4:
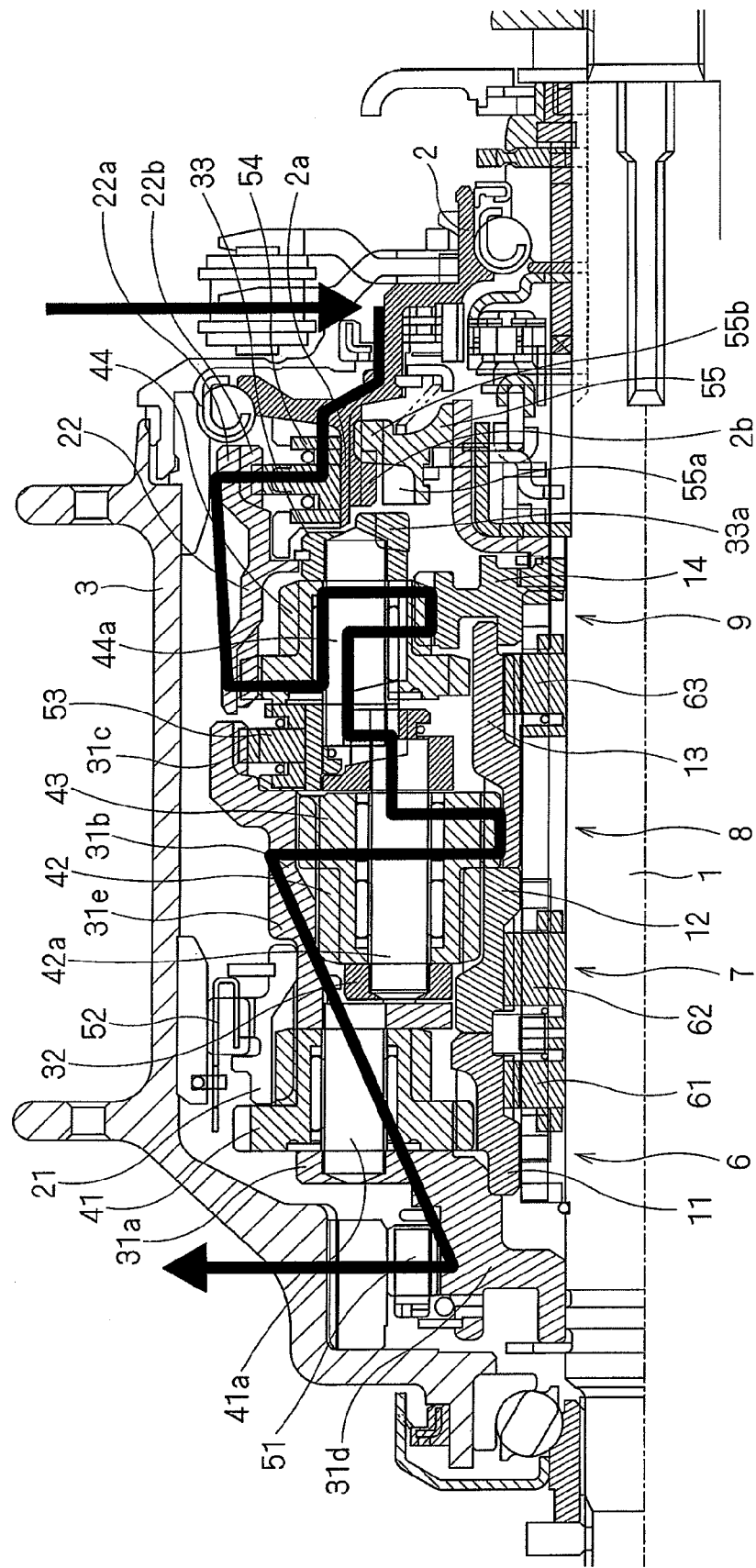
FIG. 4 is a longitudinal cross-sectional view of the hub transmission according to FIG. 1 in speed stage 3.
Figure 5:
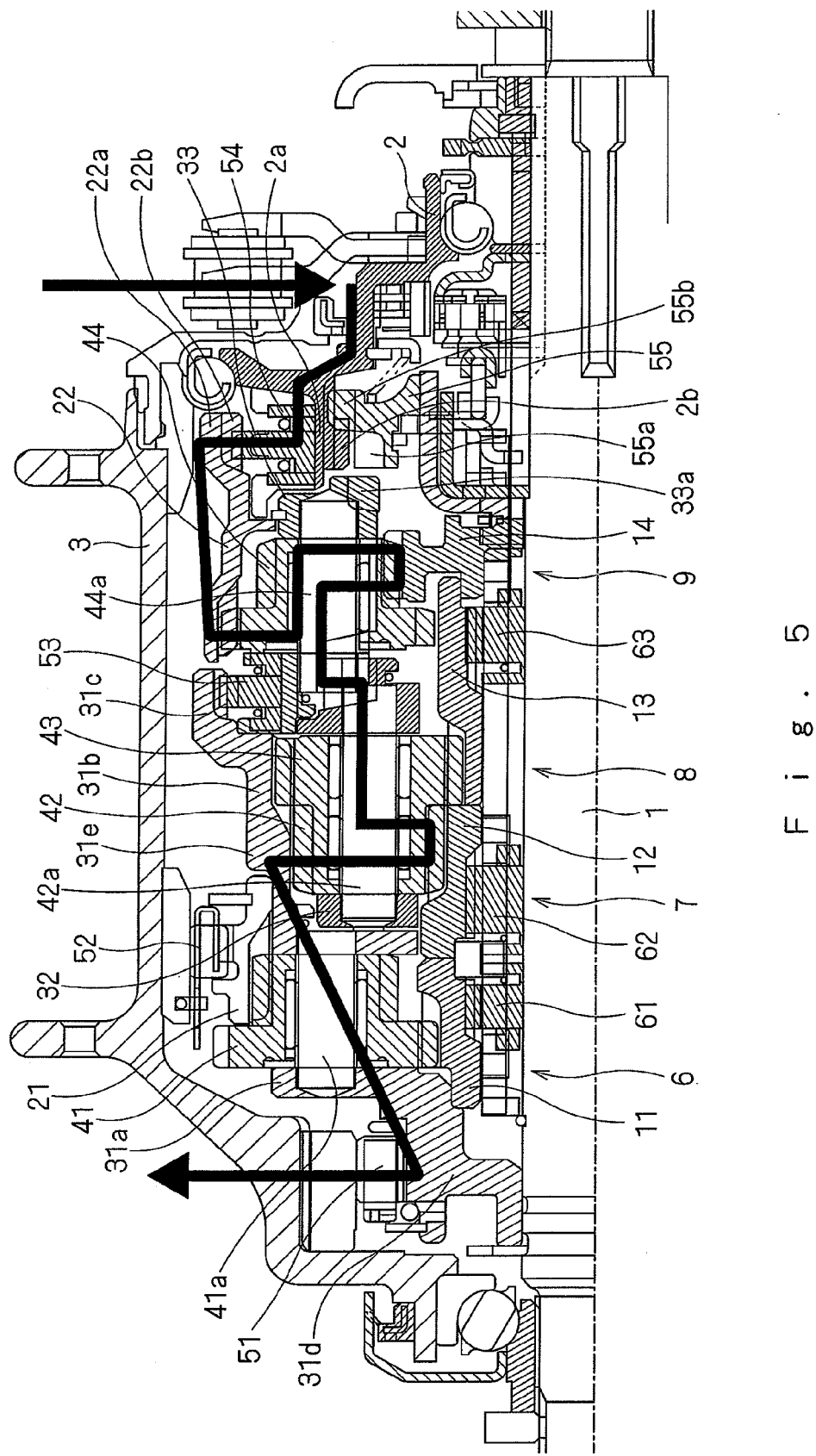
FIG. 5 is a longitudinal cross-sectional view of the hub transmission according to FIG. 1 in speed stage 4.
Figure 6:
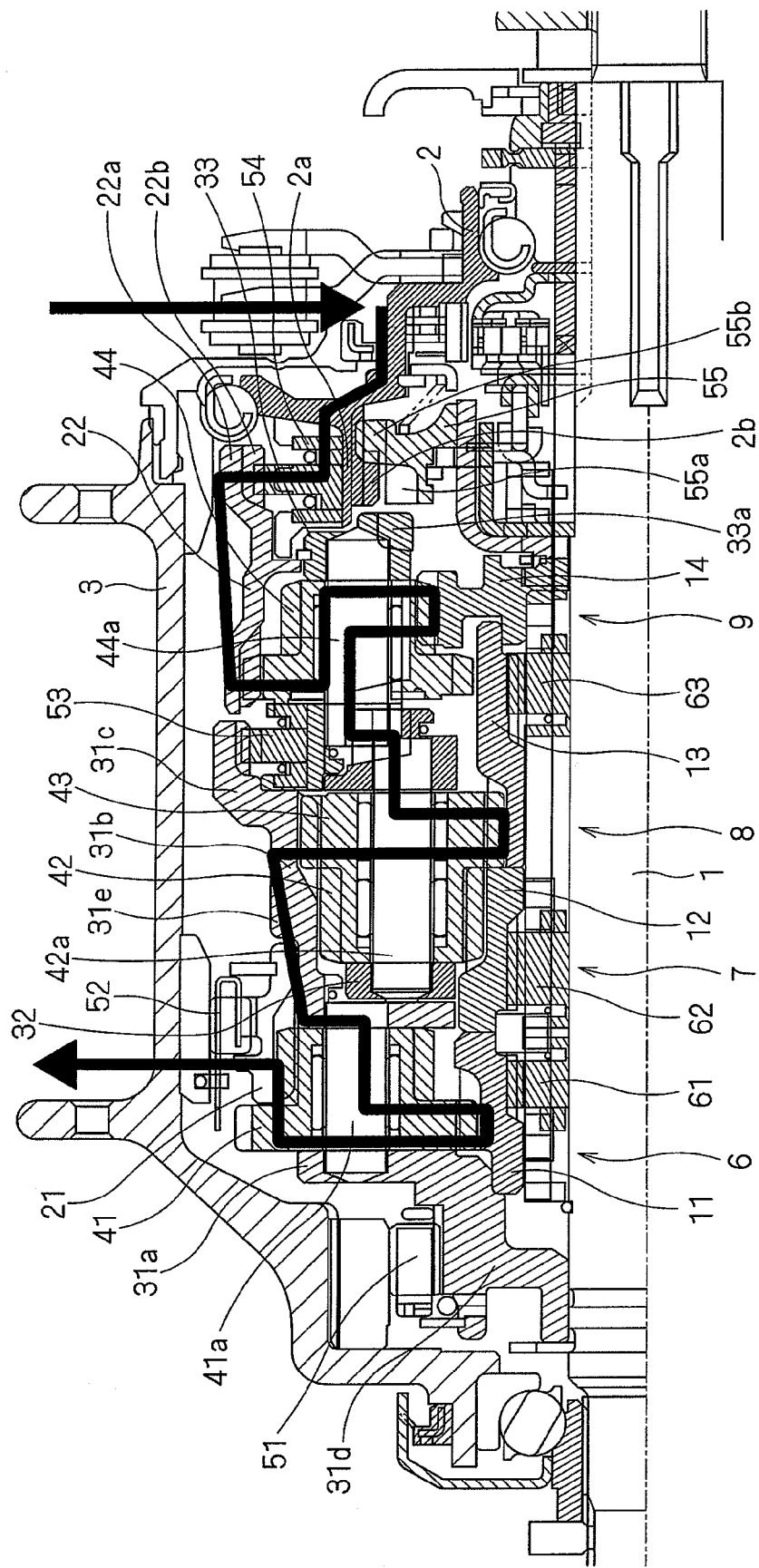
FIG. 6 is a longitudinal cross-sectional view of the hub transmission according to FIG. 1 in speed stage 5.
Figure 7:
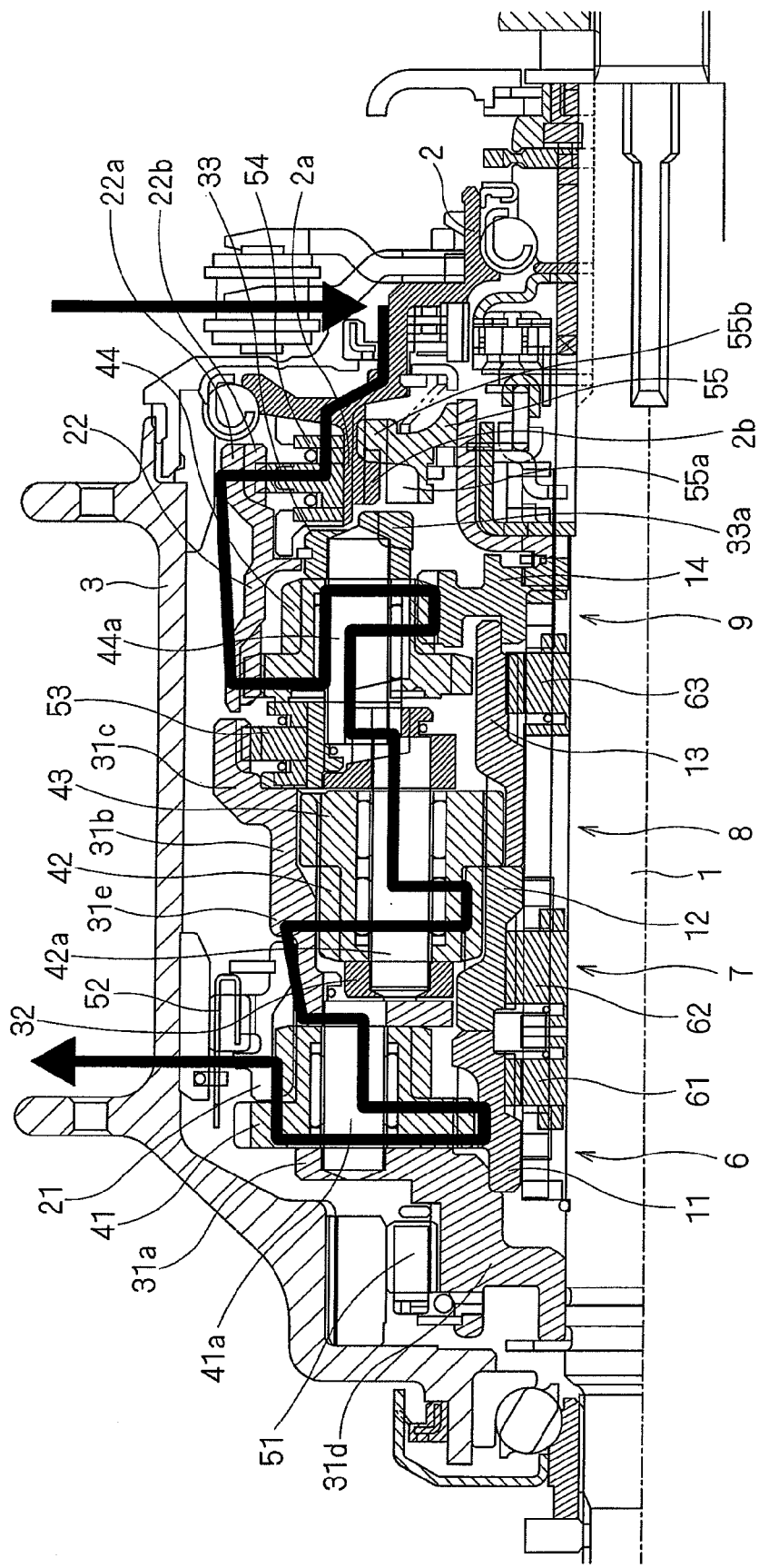
FIG. 7 is a longitudinal cross-sectional view of the hub transmission according to FIG. 1 in speed stage 6.
Figure 8:
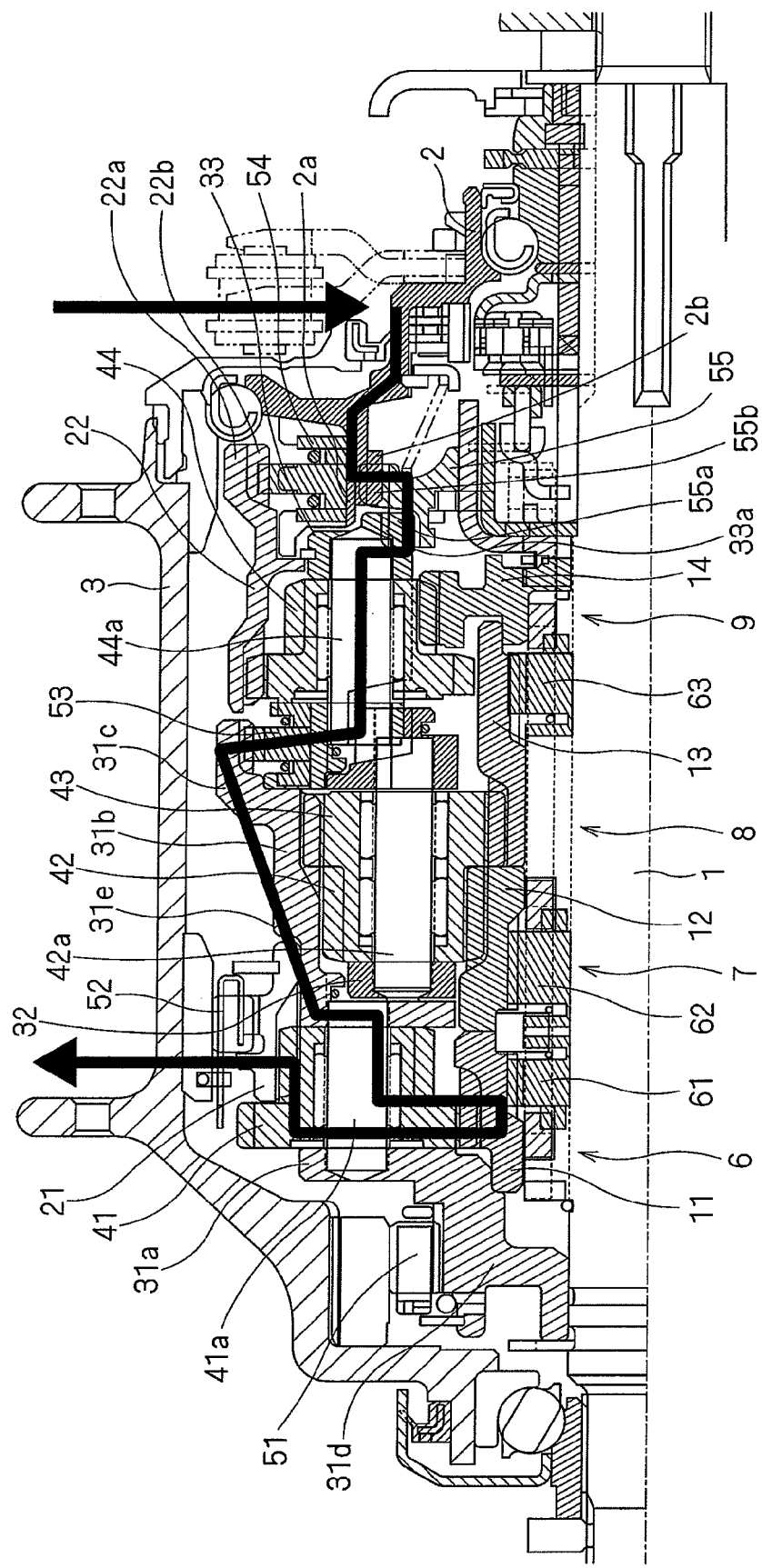
FIG. 8 is a longitudinal cross-sectional view of the hub transmission according to FIG. 1 in speed stage 7.
Figure 9:
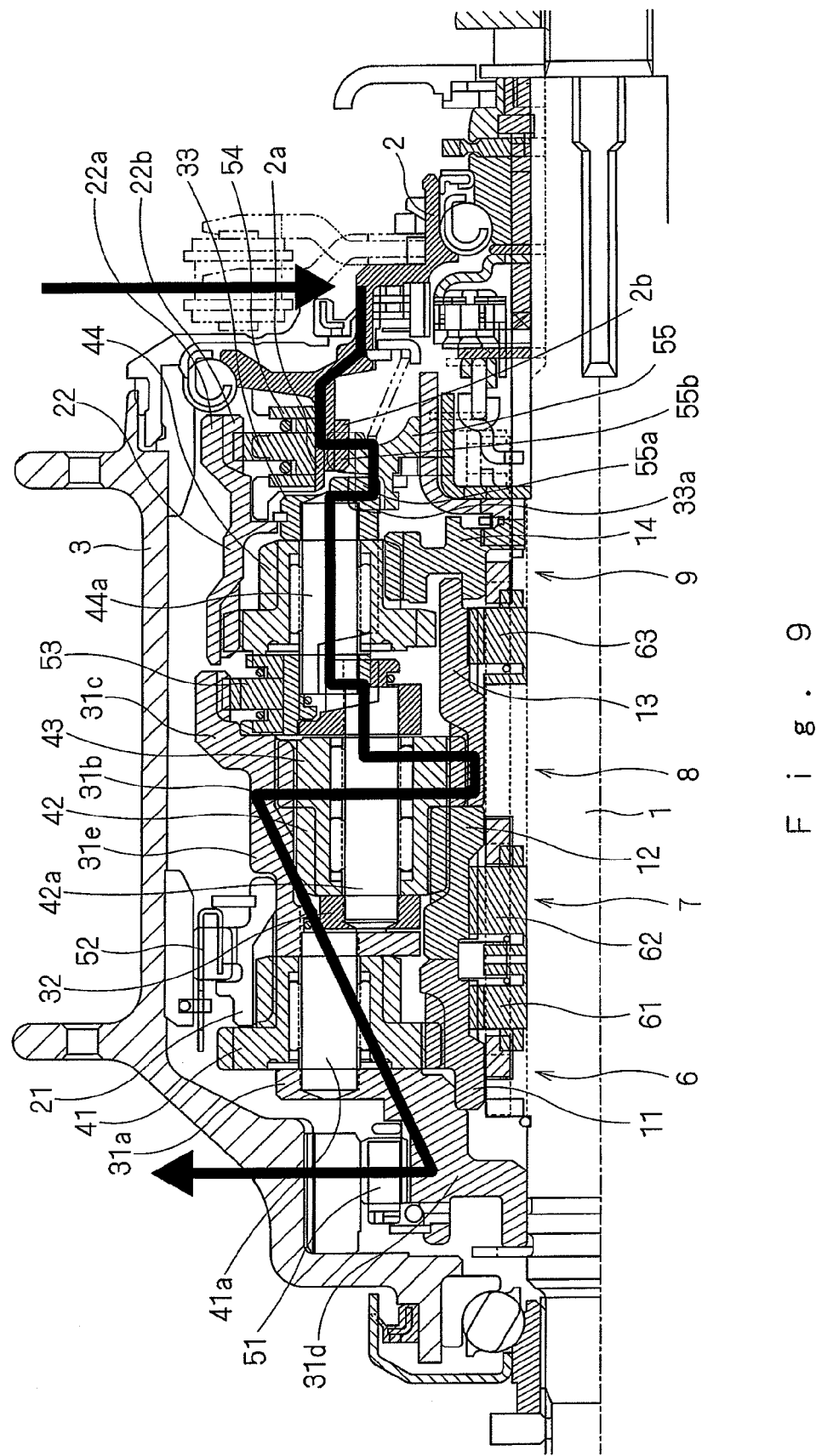
FIG. 9 is a longitudinal cross-sectional view of the hub transmission according to FIG. 1 in speed stage 8.
Figure 10:
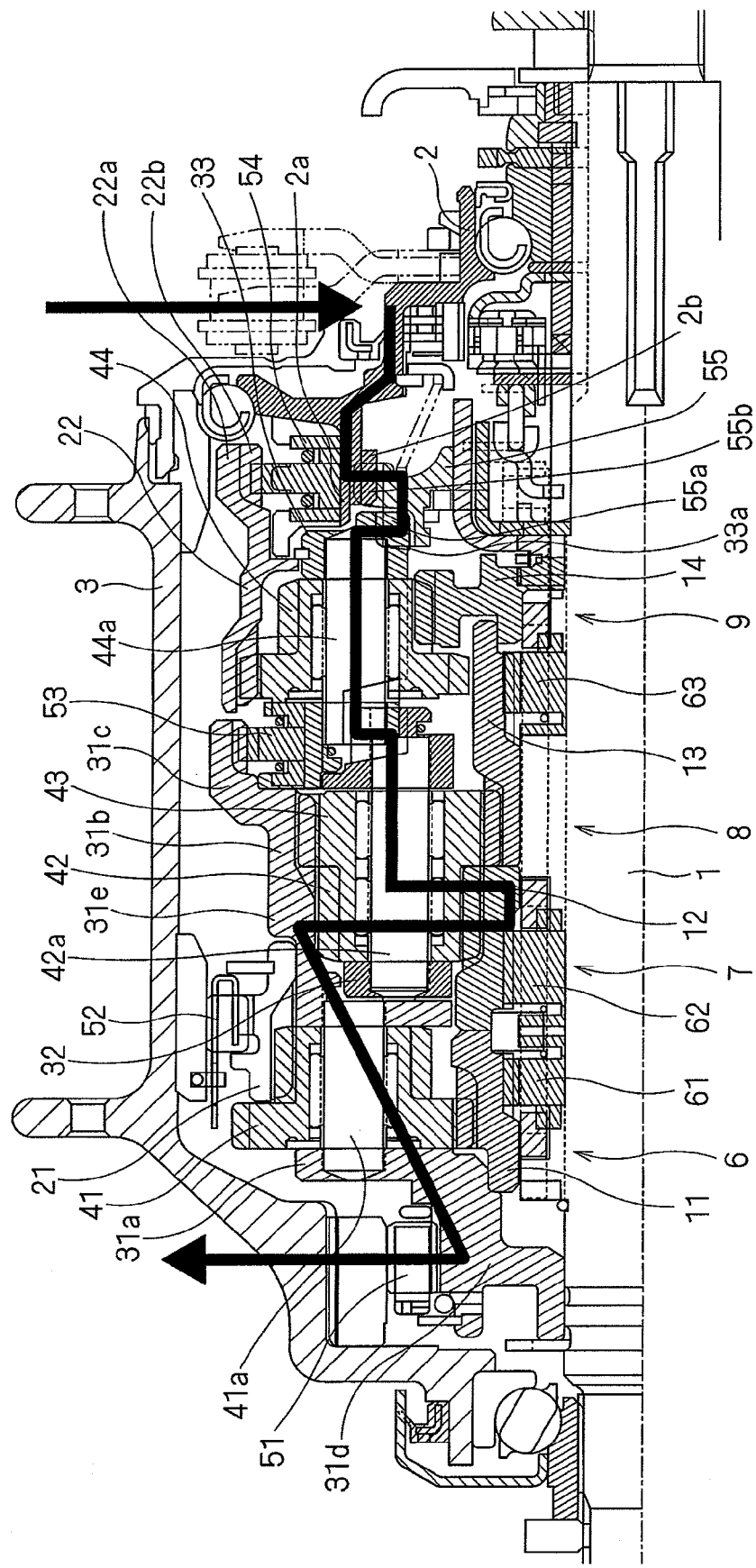
FIG. 10 is a longitudinal cross-sectional view of the hub transmission according to FIG. 1 in speed stage 9.
Figure 11:
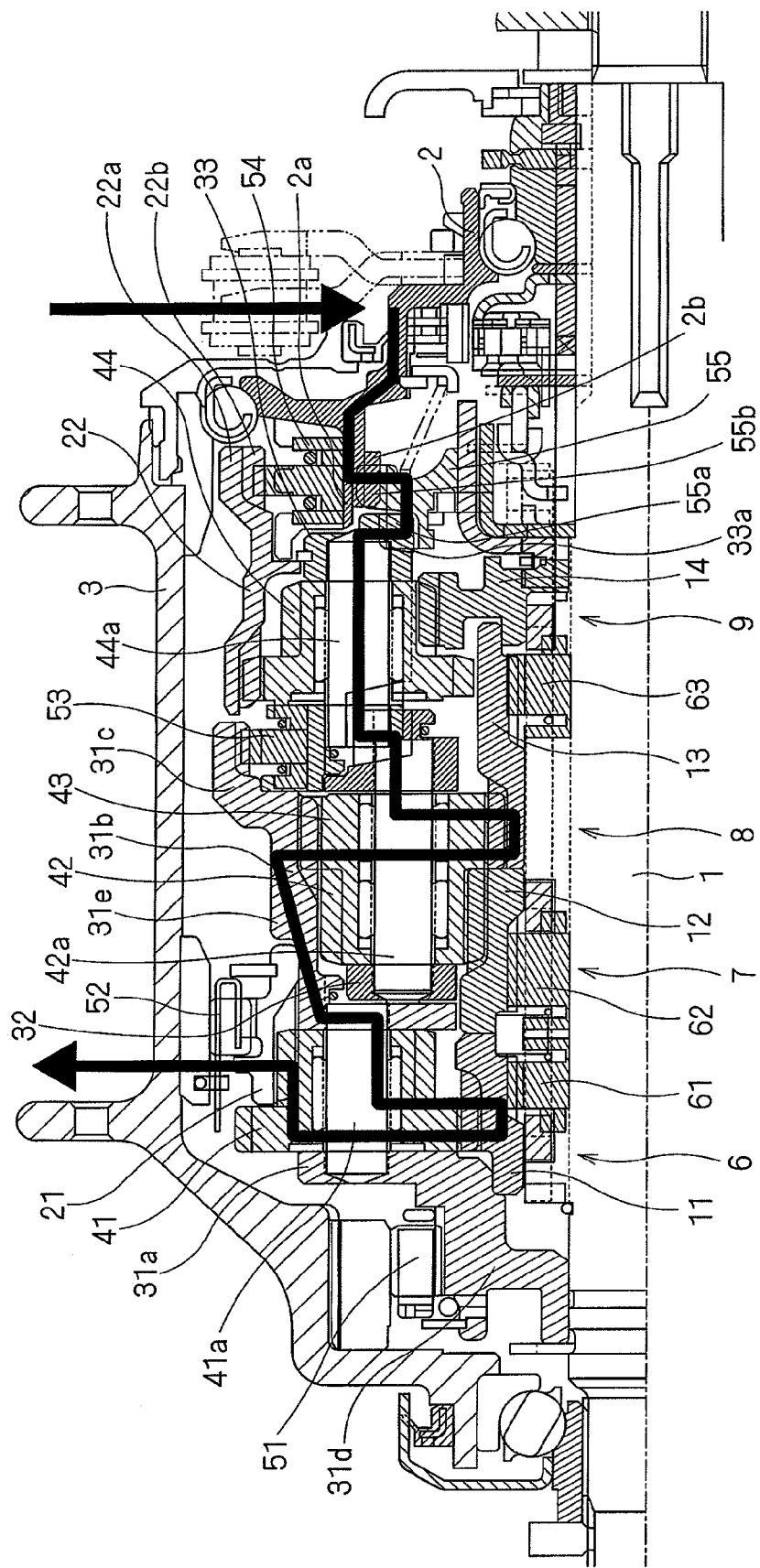
FIG. 11 is a longitudinal cross-sectional view of the hub transmission according to FIG. 1 in speed stage 10.

Referring initially to FIG. 1, an 11-speed bicycle hub transmission is illustrated in accordance with one preferred embodiment. The hub transmission is configured and arranged be mounted to the rear wheel of a bicycle. The hub transmission basically includes a hub axle 1 and a driver 2 which is rotatably supported by the hub axle 1. The hub transmission further includes a hub shell 3 which is rotatably supported by the hub axle 1. A power transmission mechanism 4 is disposed between the driver 2 and the hub shell 3 to selectively transmit rotational power from the driver 2 to the hub shell 3 through one of a plurality of power transmission paths that can be selected to change the gear ratio as desired by the rider.

To select one of the power transmission paths a shift mechanism 5 is provided. The shift mechanism 5 corresponds to the shift mechanism described in detail in European Patent No. EP 1 323 627 A2 and U.S. Pat. No. 6,607,465 B1 mentioned therein. The hub transmission has a plurality of planetary gear mechanisms 6, 7, 8 and 9. The planetary gear mechanisms 6, 7, 8 and 9 are arranged in series and form at least four planetary gear mechanisms in the illustrated embodiment. The higher the number of the planetary gear mechanism 6, 7, 8 or 9, the closer it is arranged to the driver 2. For example, the second planetary gear mechanism 7 is closer to the driver 2 than the first planetary gear mechanism 6.

As mentioned above, the power transmission mechanism 4 has the planetary gear mechanisms 6, 7, 8 and 9 including a downstream planetary gear unit and an upstream planetary gear unit with the upstream planetary gear unit being arranged closer to the driver 2 than the downstream planetary gear unit. As seen in the direction of the rotational power flow, the downstream planetary gear unit is arranged after the upstream planetary gear unit. For example, the downstream planetary gear unit includes the first planetary gear mechanism 6 and the upstream planetary gear unit includes the third planetary gear mechanisms 8.

As is evident from FIG. 1, the downstream planetary gear unit has a planetary gear carrier 31, and the upstream planetary gear unit has planetary gears 43 with the planetary gear carrier 31 of the downstream or first planetary gear mechanism 6 meshing with planetary gears 43 of the upstream or third planetary gear mechanism 8.

In general, the planetary gear carrier 31 has a longitudinally extending shape that is adapted to overlap components of the power transmission mechanism 4 that are arranged upstream of the first planetary gear mechanism 6 and, thus, more proximate to the driver 2 than the downstream planetary gear mechanism 6.

In particular, the planetary gear carrier 31 of the downstream planetary gear mechanism 6 axially extends from the area of the downstream or first planetary gear mechanism 6 to the area of the upstream or third planetary gear mechanism 8. As illustrated in FIG. 1, the planetary gear carrier 31 axially extends over more than ⅓ to ½ of the entire length of the hub transmission. The axial extension of the planetary gear carrier 31 is such that the second planetary gear mechanism 7 which is arranged between the downstream planetary gear mechanism 6 and the upstream planetary gear mechanism 8 is overlapped by the planetary gear carrier 31. In the embodiment according to FIG. 1, the second planetary gear mechanism 7 is not engaged with the planetary gear carrier 31.

The planetary gear carrier 31 has a stepped shape with the inner diameter of the subsequent steps increases towards the driver 2. The stepped shape of the planetary gear carrier 31 will be described in more detail in conjunction with the respective components associated thereto.

The planetary gear carrier 31 further comprises a (first) clutch engaging portion 31c which is arranged on the axial end of the planetary gear carrier 31 proximate to the driver 2. The clutch engaging portion 31c is provided to engage with/disengage from a clutch 53 (third clutch) which will be described in more detail in connection with the fourth planetary gear mechanism 9.

The planetary gear carrier 31 further has a ring gear portion 31b. The ring gear portion 31b is integrally connected with a clutch engaging portion 31c and is formed with a smaller inner diameter than clutch engaging portion 31c. The ring gear portion 31b meshes with planetary gears 43 of the upstream or third planetary gear mechanism 8. The inner diameter of the ring gear portion 31b is larger than the outer diameter of second planetary gears 42 of the second planetary gear mechanism 7 to avoid engagement or collision therewith.

The ring gear portion 31b is integrally connected with a carrier portion 31a which supports first planetary gears 41 of the first downstream planetary gear unit 6. The first planetary gears 41 are rotatably supported by first planetary gear shafts 41a which are disposed in the carrier portion 31a of the planetary gear carrier 31. Typically, three ore more first planetary gears 41 are provided in the first planetary gear mechanism 6.

A further (or second) clutch engaging portion 31d is integrally formed with the carrier portion 31a and is provided for engaging with/disengaging from a first clutch 51 to establish/interrupt a power transmission from the planetary gear carrier 31 to the hub shell 3. The further or second clutch engaging portion 31d is arranged downstream of the planetary gear mechanism 6. The ring gear portion 31b and the (first) clutch engaging portion 31c are located upstream of the planetary gear mechanism 6. Again, the downstream or upstream arrangement of components is seen and to be understood in the direction of the power flow.

The plurality of planetary gear mechanisms 6, 7, 8 and 9 will be described in the following.

The first planetary gear mechanism 6 is arranged most downstream or most distant from the driver 2 with the first sun gear 11 being rotatably supported by the hub axle 1 and selectively lockable with the hub axle 1. Between an inner peripheral surface of the first sun gear 11 and the hub axle 1, a first sun gear guide ring 61 is non-rotatably fixed to the hub axle 1. The first sun gear guide ring 61 allows for the locking and unlocking the first sun gear 11 by means of the shifting mechanism 5. Coaxially arranged in relation to and rotatably supported by the hub axle 1 is a first ring gear 21 with the first planetary gears 41 being rotatably supported by the (first) planetary gear carrier 31 and mesh with the first sun gear 11 and the first ring gear 21.

As illustrated in FIG. 1, the first planetary gears 41 comprise two gear stages wherein the large diameter gear stage meshes with the first sun gear 11 and the small diameter gear stage meshes with the ring gear 21. Small diameter gear stage of first planetary gears 41 is arranged proximate to the second planetary gear mechanism 7. The ring gear 21 can be connected with or disconnected from the hub shell 3 by means of a second (one-way) clutch 52 which is disposed between the first ring gear 21 and the hub shell 3.

As described above, the ring gear carrier 31 of the first planetary gear mechanism 6 extends axially beyond the planetary gears 41 in a longitudinal direction of the hub transmission thereby overlapping at least the subsequently arranged upstream second and third planetary gear mechanisms 7, 8. The outer contour of first planetary gear carrier 31 is adapted to partially accommodate the ring gear 21 and forms a shoulder 31e such that the ring gear 21 is arranged between the shoulder 31e and the large diameter gear stage of the first planetary gears 41.

The second planetary gear mechanism 7 is located upstream of the first planetary gear mechanism 6 and comprises a second sun gear 12 which is rotatably supported by and lockable with the hub axle 1. Between an inner surface of the second sun gear 12 and the hub axle 1, a second sun gear guide ring 62 is non-rotatably fixed to the hub axle 1. A plurality of second planetary gears 42 is rotatably supported by a second planetary gear carrier 32 which is rotatably supported by the hub axle 1. To this end, the second planetary gears 42 are rotatably supported by a second planetary gear shaft 42a which is supported by a second planetary gear carrier 32. Typically three or more second planetary gears 42 are provided.

The third planetary gear mechanism 8 is arranged upstream of the second planetary gear mechanism 7 and comprises a third sun gear 13 which is rotatably supported by and lockable with the hub axle 1. Between an inner peripheral surface of a third sun gear 13 and the hub axle 1, a third sun gear guide ring 63 is arranged and non-rotatably fixed to hub axle 1. The third sun gear guide ring 63 can be actuated by means of the shifting mechanism 5 to lock/unlock the sun gear 13. A plurality of third planetary gears 43 meshes with the third sun gear 13 and is rotatably supported by the second planetary gear carrier 32. In particular, third planetary gears 43 are arranged on second a planetary gear shaft 42a which, thus, represents a common planetary gear shaft for the second and third planetary gears 42 and 43.

As is evident from FIG. 1, second and third planetary gears are non-rotatably connected and integrally form a stepped planetary gear 402. The small diameter gear stage of the stepped planetary gear 402 meshes with the second sun gear 12, and the large diameter gear stage of the stepped planetary gear 402 meshes with the third sun gear 8. Moreover, the large diameter gear stage of the stepped planetary gear 402 meshes with the ring gear portion 31b of the downstream planetary gear carrier 31. Thus, it is possible to establish a transmission path connecting the third sun gear 8 with the first planetary gear carrier 31.

A fourth planetary gear mechanism 9 is arranged upstream of the third planetary gear mechanism 8 and represents the planetary gear mechanism closest to the driver 2. The fourth planetary gear mechanism 9 comprises a fourth sun gear 14 which is non-rotatably fixed to the hub axle 1. A second ring gear 22 is coaxially arranged with and rotatably supported by the hub axle 1. Between the second ring gear 22 and the fourth sun gear 14 a plurality of fourth planetary gears 44 is arranged which are formed as two-step planetary gears. The large diameter gear stage of the planetary gears 44 meshes with the ring gear 22 and the small diameter gear stage of the fourth planetary gears 44 meshes with the fourth sun gear 14. Typically three or more fourth planetary gears 44 are provided.

The fourth planetary gears 44 are rotatably supported by a third planetary gear carrier 33 which can rotate around the hub axle 1. The third planetary gear carrier 33 comprises third planetary gear shafts 44a which rotatably support the fourth planetary gears 44. The third planetary gear carrier 33 is engaged with the second planetary gear carrier 32 to transmit power from the third planetary gear carrier 33 to the second planetary gear carrier 32.

As is readily apparent from FIG. 1, the middle axes of the second planetary gear shafts 42a and the third planetary gear shafts 44a are radially spaced apart. The middle axes of third planetary gear shafts 44a are arranged on a cylindrical plane having a larger diameter than a cylindrical plane which comprises the middle axes of the second planetary gear shafts 42a. The cylindrical plane which comprises the middle axes of first planetary gear shafts 41a corresponds to the cylindrical plane of the middle axes of third planetary gear shafts 44a. Thus, the middle axes of the second planetary gear shafts 42a which are arranged between the first and fourth planetary gear mechanisms 6 and 9 are closer to the hub axle 1 than the middle axes of the first and third planetary gear shafts 41a and 44a, respectively.

The third planetary gear carrier 33 of the fourth planetary gear mechanism 9 can be connected to the downstream planetary gear carrier 31. For this purpose, the third clutch 53 mentioned above is provided between the third planetary gear carrier 33 and the first planetary gear carrier 31. In particular, the third clutch 53 is arranged at an end of the third planetary gear carrier 33 distant from the driver 2 and engages with/disengages from the clutch engaging portion 31c of downstream of the first planetary gear carrier 31. For the power transmission from the driver 2 to the fourth planetary gear mechanism 9, fourth and fifth clutches 54 and 55 are provided.

The fourth clutch 54 is a one-way clutch disposed between the driver 2 and the second ring gear 22. The second ring gear 22 comprises an axial projection 22a which extends towards the driver 2. The axial projection 22a comprises on its inner peripheral surface a clutch engaging portion 22b which cooperates with the fourth clutch 54 to lock or unlock the second ring gear 22 with the driver 2. The fourth clutch 54 is supported by an axial projection 2a of the driver 2 that extends in parallel with the axial projection 22a of the ring gear 22.

For speed stages 1 to 6, the fourth clutch 54 is engaged with the ring gear 22 to transmit power from the driver 2 to the ring gear 22.

For speed stages 7 to 11, a fifth clutch 55 is provided which is disposed between the driver 2 and the third planetary gear carrier 33 for transmitting rotational power from the driver 2 to the third planetary gear driver 33. The fifth clutch 55 is formed as a clutch ring and is axially movable in a longitudinal direction of the hub axle 1. The fifth clutch 55 comprises two engaging portions 55a, 55b which are adapted to engage with clutch engaging portions 2b and 33a which are provided on the driver 2 and the third planetary gear carrier 33, respectively.

The clutch engaging portion 2b of the driver 2 is formed on the inner peripheral surface of the axial projection 2a and engages with the upper or radial engaging portion 55b of the fifth clutch 55. The clutch engaging portion 33a of the third planetary gear carrier 33 is adapted to engage with/disengage from the lower or axial engaging portion 55a of the fifth clutch 55.

For speed stages 7 to 11, the axial engaging portion 55a of the fifth clutch 55 and the clutch engaging portion 33a of the third planetary gear carrier 33 are coupled and the fourth clutch 54 is uncoupled.

A more detailed description of the aforementioned clutch mechanism including the fourth and fifth clutches 54 and 55 is disclosed in EP 1 323 627 A2 as well as in European Patent Application 07 001 076.4, both owned by Shimano Inc.

The function of the hub transmission according to FIG. 1 is explained with reference to FIGS. 2 to 12 in which the coupling of the various components for each speed stage and the specific power transmission path realized thereby are illustrated. The bold lines and arrows indicated in FIGS. 2 to 12 illustrate the rotational power flow through the power transmission mechanism 4. The coupling of the various components as well as the power transmission paths are indicated in the following Tables 1 and 2 wherein Table 1 concerns the coupling of the components and Table 2 concerns the specific power transmission path.

TABLE 1

| Speed Stage | Clutch ring 55 (Driver and 3rd Planetary gear carrier 33) | First Sun gear 11 | Second Sun gear 12 | Third Sun gear 13 | Gear Ratio |
| --- | --- | --- | --- | --- | --- |
| 1 | Disengaged | Free | Free | Free | 0.527 |
| 2 | Disengaged | Locked | Free | Free | 0.681 |
| 3 | Disengaged | Free | Free | Locked | 0.770 |
| 4 | Disengaged | Free | Locked | Free | 0.873 |
| 5 | Disengaged | Locked | Free | Locked | 0.995 |
| 6 | Disengaged | Locked | Locked | Free | 1.127 |
| 7 | Engaged | Locked | Free | Free | 1.292 |
| 8 | Engaged | Free | Free | Locked | 1.462 |
| 9 | Engaged | Free | Locked | Free | 1.656 |
| 10 | Engaged | Locked | Free | Locked | 1.888 |
| 11 | Engaged | Locked | Locked | Free | 2.139 |

TABLE 2

| Speed Stage | Power Transmission Path |
| --- | --- |
| 1 | Driver—4th clutch 54—2nd ring gear 22—(4th planet gear 44 rotates around 4th sun gear 14) - 3rd planetary gear carrier 33- 3rd clutch 53—1st planetary carrier 31—1st clutch 51—Hub Shell |
| 2 | Driver—4th clutch 54—2nd ring gear 22—(4th planet gear 44 rotates around 4th sun gear 14) - 3rd planetary gear carrier 33—3rd clutch 53—1st planetary carrier 31—(1st planet gear 41 rotates around 1st sun gear 11)—1st ring gear 21—2nd clutch 52—Hub Shell |
| 3 | Driver—4th clutch 54—2nd ring gear 22—(4th planet gear 44 rotates around 4th sun gear 14)—3rd planetary gear carrier 33- 2nd planetary gear carrier 32—(2nd planet gear 42 rotates around 2nd sun gear 12)—1st planetary carrier 31—1st clutch 51—Hub Shell |
| 4 | Driver—4th clutch 54—2nd ring gear 22—(4th planet gear 44 rotates around 4th sun gear 14)—3rd planetary gear carrier 33—2nd planetary gear carrier 32—(2nd planet gear 42 rotates around 2nd sun gear 12)—1st planetary carrier 31—1st clutch 51 - Hub Shell |
| 5 | Driver—4th clutch 54—2nd ring gear 22—(4th planet gear 44 rotates around 4th sun gear 14)—3rd planetary gear carrier 33—2nd planetary gear carrier 32—(3rd planet gear 43 rotates around 3rd sun gear 13)—1st planetary carrier 31—(1st planet gear 41 rotates around 1st sun gear 11)—1st ring gear 21—2nd clutch 52—Hub Shell |
| 6 | Driver—4th clutch 54—2nd ring gear 22—(4th planet gear 44 rotates around 4th sun gear 14)—3rd planetary gear carrier 33—2nd planetary gear carrier 32—(2nd planet gear 42 rotates around 2nd sun gear 12)—1st planetary carrier 31—(1st planet gear 41 rotates around 1st sun gear 11)—1st ring gear 21—2nd clutch 52—Hub Shell |
| 7 | Driver—5th clutch 55—3rd planetary gear carrier 33—3rd clutch 53- 1st planetary carrier 31—(1st planet gear 41 rotates around 1st sun gear 11)—1st ring gear 21—2nd clutch 52—Hub Shell |
| 8 | Driver—5th clutch 55—3rd planetary gear carrier 33—2nd planetary gear carrier 32—(3rd planet gear 43 rotates around 3rd sun gear 13)—1st planetary carrier 31—1st clutch 51 - Hub Shell |
| 9 | Driver—5th clutch 55—3rd planetary gear carrier 33—2nd planetary gear carrier 32 - (2nd planet gear 42 rotates around 2nd sun gear 12)—1st planetary carrier 31 - 1st clutch 51—Hub Shell |
| 10 | Driver—5th clutch 55—3rd planetary gear carrier 33—2nd planetary gear carrier 32—(3rd planet gear 43 rotates around 3rd sun gear 13)—1st planetary carrier 31—(1st planet gear 41 rotates around 1st sun gear 11)—1st ring gear 21—2nd clutch 52—Hub Shell |
| 11 | Driver—5th clutch 55—3rd planetary gear carrier 33—2nd planetary gear carrier 32—(2nd planet gear 42 rotates around 2nd sun gear 12)—1st planetary carrier 31—(1st planet gear 41 rotates around 1st sun gear 11)—1st ring gear 21—2nd clutch 52—Hub Shell |

In summary, the hub transmission according to the described embodiment of the invention allows the realization of an 11 speed internal hub transmission wherein the diameter of the hub shell 2 is similar to the diameter of a currently available 8 speed hub transmission. This means that the hub transmission of the invention provides more speed stages than the conventional hub transmission without increasing the hub diameter. Moreover, the hub transmission according to FIG. 1 provides the advantage that all transmission paths are simple which leads to an efficient power transmission.

In general, the planetary gear carrier 31 of the downstream planetary gear unit 6 has an axially elongated shape adapted to mesh with the planetary gears 43 of the upstream planetary gear mechanism 8. The axially elongated shape of the downstream planetary gear carrier 31 allows for a compact, small diameter internal hub transmission for a bicycle with highly efficient transmission paths. Moreover, the axially elongated shape of the planetary gear carrier 31 allows for coupling and uncoupling the planetary gear carrier 31 with/from a planetary gear carrier 33 of a further upstream planetary gear mechanism 9. In particular, the axially elongated planetary gear carrier 31 of the downstream planetary gear unit 6 is adapted to selectively transmit rotational power from the planetary gears 43 of the upstream planetary gear mechanism 8 and to selectively transmit rotational power from the planetary gear carrier 33 of the further upstream planetary gear mechanism 9.

Figure 12:
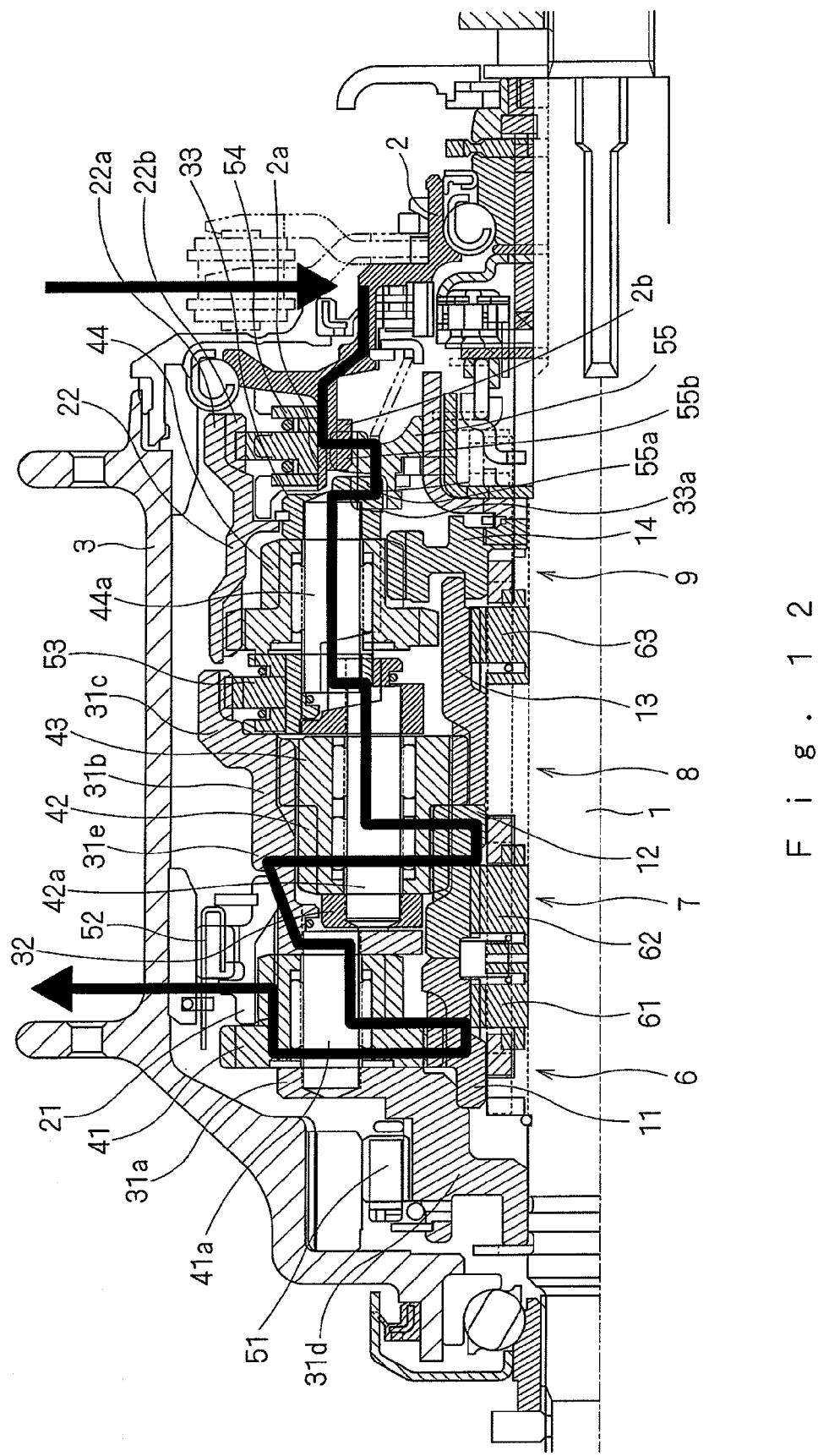
FIG. 12 is a longitudinal cross-sectional view of the hub transmission according to FIG. 1 in speed stage 11.

FIGS. 1 to 12 refer to a hub transmission without a brake unit to explain the design and function of the gear mechanisms provided in the hub transmission. The hub transmission according to FIGS. 1 and 12 is supplemented in FIGS. 13 to 17 by a brake unit 80 which is coupled with the most downstream planetary gear unit to produce a braking force if the planetary gear mechanism is rotated in a reverse direction. The planetary gear mechanisms shown in FIGS. 1 to 12 and explained in the following in detail correspond to the planetary gear mechanisms of the hub transmissions according to FIGS. 13 to 17. In other words, embodiments of the hub transmission with a coaster brake are illustrated in FIGS. 13 to 17 with the gear mechanism of the hub transmissions being substantially the same as in FIGS. 1 to 12. The hub transmission according to FIGS. 1 to 12 is modified in FIGS. 13 to 17 insofar as clutches 53a and 54b are used that allow transmitting a reverse rotational force from driver 2 to the brake unit 80 which is coupled with the gear mechanism. The brake unit 80 is explained with reference to FIGS. 13 and 15. The same brake unit 80 is also used in the embodiment according to FIG. 14.

The brake unit 80 is disposed distant from the driver 2 and is operatively connected with the driver 2 by the planetary gear mechanisms arranged therebetween. The brake unit 80 includes a cup 81 which is non-rotatably connected with the hub shell 3, and therefore allows the transmission of a rotational force to the hub shell 3. The cup 81 forms a circumferentially disposed braking surface 82 against which a plurality of brake elements 83 can be pressed to transmit a reverse braking torque to the hub shell 3.

Figure 13:
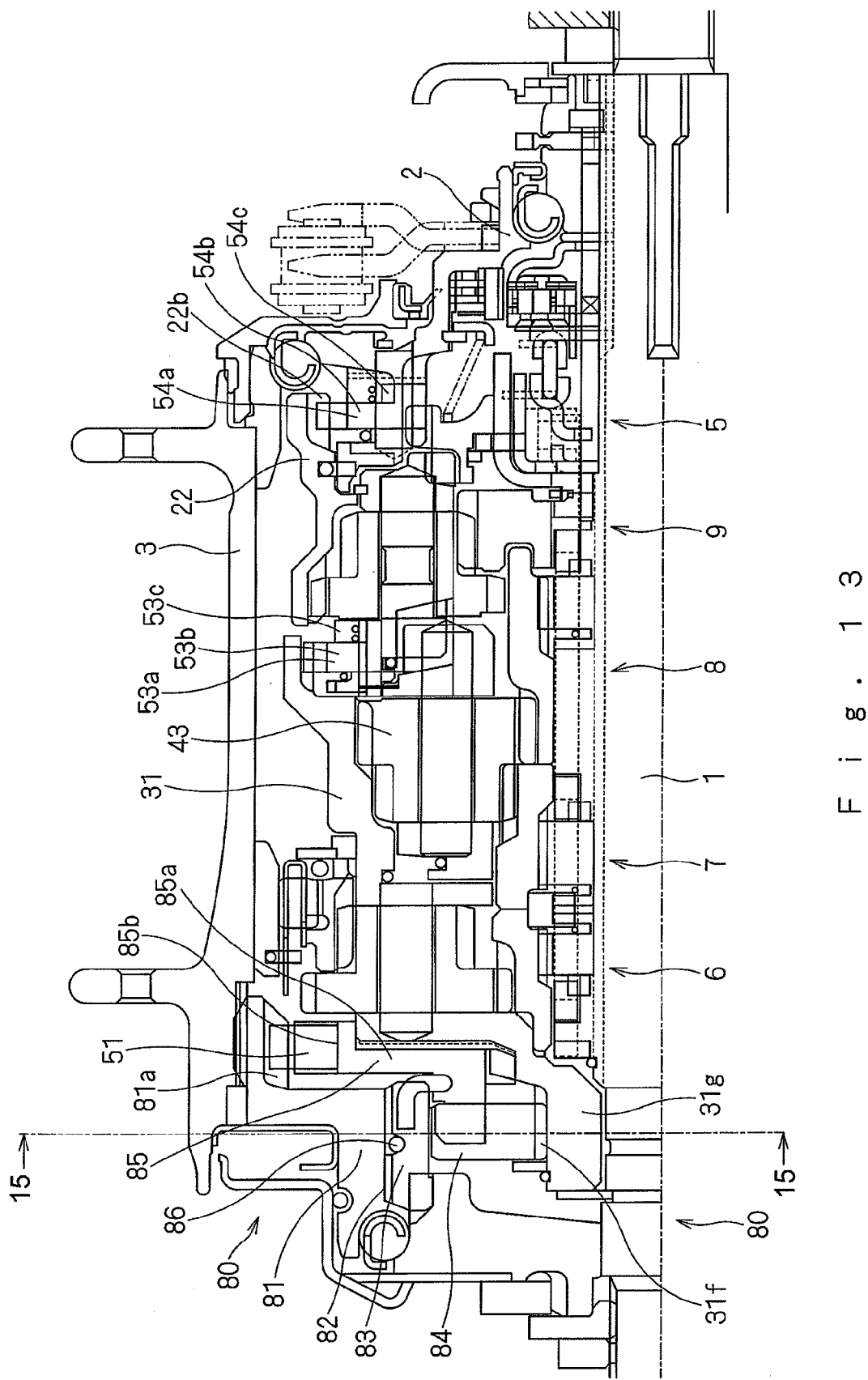
FIG. 13 is a longitudinal cross sectional view of a hub transmission according to an embodiment of the invention with a brake unit.
Figure 15:
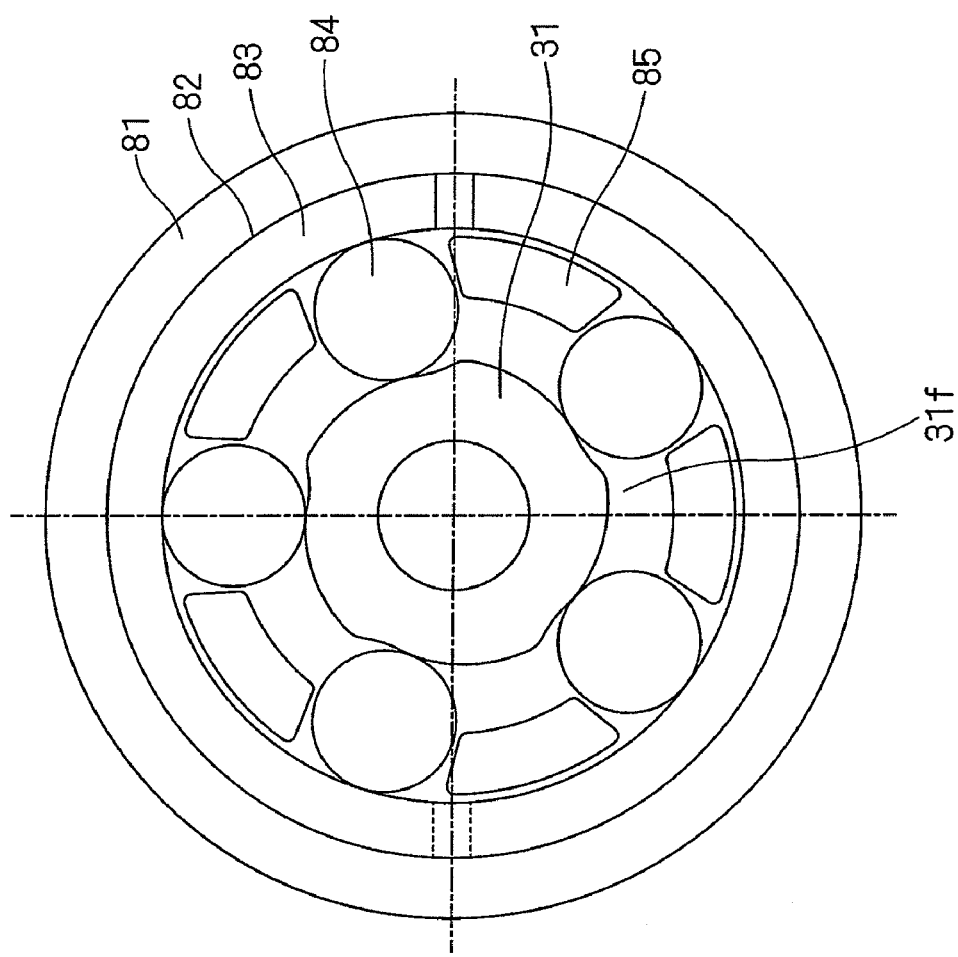
FIG. 15 is a cross sectional view of the brake unit along the line 15-15 in FIG. 13.

The brake elements 83 are preferably formed by a plurality of circumferentially disposed arcuate brake shoes which are biased radially inwardly from the braking surface 82 by means of a brake spring 86. This arrangement is shown in FIG. 13. FIG. 15 schematically shows the brake element 83 as one ring. The brake elements 82 are actuated by means of a plurality of control elements 84 in the form of rollers which are disposed circumferentially on an axial end 31g of the planetary gear carrier 31 of the downstream planetary gear unit 6. The axial end 31g of the planetary gear carrier 31 comprises on its outer peripheral surface cam portions or cam surfaces 31f which cooperate with the plurality of rollers or control elements 84 to move same in a radially outward direction for actuating brake elements 83 if the planetary gear carrier 31 rotates in a reverse direction.

The control elements 84 or the rollers, respectively, are held by a retaining element 85 which is designed as a roller cage supporting the plurality of circumferentially disposed rollers. The retaining element 85 is engaged with the planetary gear carrier 31 of the downstream planetary gear mechanism 6. The retaining element 85 comprises a radially extending projection 85a which is disposed between the brake unit 80 and the first planetary gear carrier 31 of the downstream planetary gear mechanism 6. A projection 85a of the retaining element 85 forms a circumferential support surface 85b.

On the support surface 85b, the first clutch 51 is provided which couples the retaining element 85 and the cup 81. The clutch 51 includes a plurality of circumferentially supposed pawls which are mounted to the retaining element 85 and the roller cage, respectively, and are biased radially outwardly by pawl springs for engaging an inner peripheral gear 81a formed on an inner side of cup 81. The pawls of the clutch 51 transmit a forward rotation of the first planetary gear carrier 31 to the cup 81 and hence to the hub shell 3.

To effect the reverse rotation of the planetary gear mechanisms 6, 7, 8 and 9 in order to apply a braking torque to the hub shell 3, third and fourth one-way clutches 53 and 54 according to FIGS. 1 to 12 are replaced in the embodiment according to FIG. 13 by third and fourth two-way clutches 53b and 54b. Also, two-way clutches 53a and 54a are designed to transmit both a forward driving torque and a reverse braking torque. The design of the clutches 53a and 54a corresponds to the design disclosed in EP Patent Publication No. 1 413 509 B1 which is assigned to Shimano, Inc. In particular, the fourth clutch 54a includes a plurality of circumferentially disposed pawls 54b which engage with an inner peripheral gear portion of the second ring gear 22, in particular the clutch engaging portion 22b. The pawls 54b are biased radially outwardly by a pawl spring, and thus, function as a one-way clutch between the driver 2 and the second ring gear 22. A plurality of (braking) pawls 54c is circumferentially disposed for driving the second ring gear 22 in a rearward direction. The third clutch 53a is designed correspondingly to fourth clutch 54a.

The embodiment according to FIG. 13 functions as follows.

The driver 2 rotates relative to the second ring gear 22 with small angles as play. The pawls 54b and 54c are supported by a pawl control cage and a ring spring disposed between the driver 2 and the second ring gear 22. When the driver 2 rotates in a reverse direction, a relative rotation between the driver 2 and the second ring gear 22 occurs at small angles and, at the same time, the ring spring rotates with the driver 2 in a reverse direction. The reverse rotation of the ring spring causes a reverse rotation of pawl control cage which, in turn, provides for bringing down the driving pawls 54b and bringing up the braking pawls 54c. Since the braking pawls 54c engage with the inner teeth of the clutch engaging portion 22b of the second ring gear 22, a reverse rotational force of the driver 2 is transmitted to the second ring gear 22 via the braking pawls 54c. Accordingly the second ring gear 22 rotates in a reverse direction.

As fourth sun gear 14 meshes with the fourth planetary gear 44, the reverse rotational force of the second ring gear 22 is transmitted to third planetary gear carrier 33.

As pawl control cage and ring spring of third clutch 53a disposed between the third carrier 33 and the first planetary gear carrier 31, the pawl control cage and the ring spring of third clutch 53a rotate in a reverse direction with the third carrier 33 within play. The pawl control cage of the third clutch 53a causes the driving pawls 53b to disengage and to engage the braking pawls 53c with the first planetary gear carrier 31. Accordingly, the first planetary gear carrier 31 rotates in a reverse direction.

Thus, the control elements 84 are outwardly forced by means of the cam surfaces 31f thereby applying a braking torque to the cup 81 and, hence, to the hub shell 3.

Figure 14:
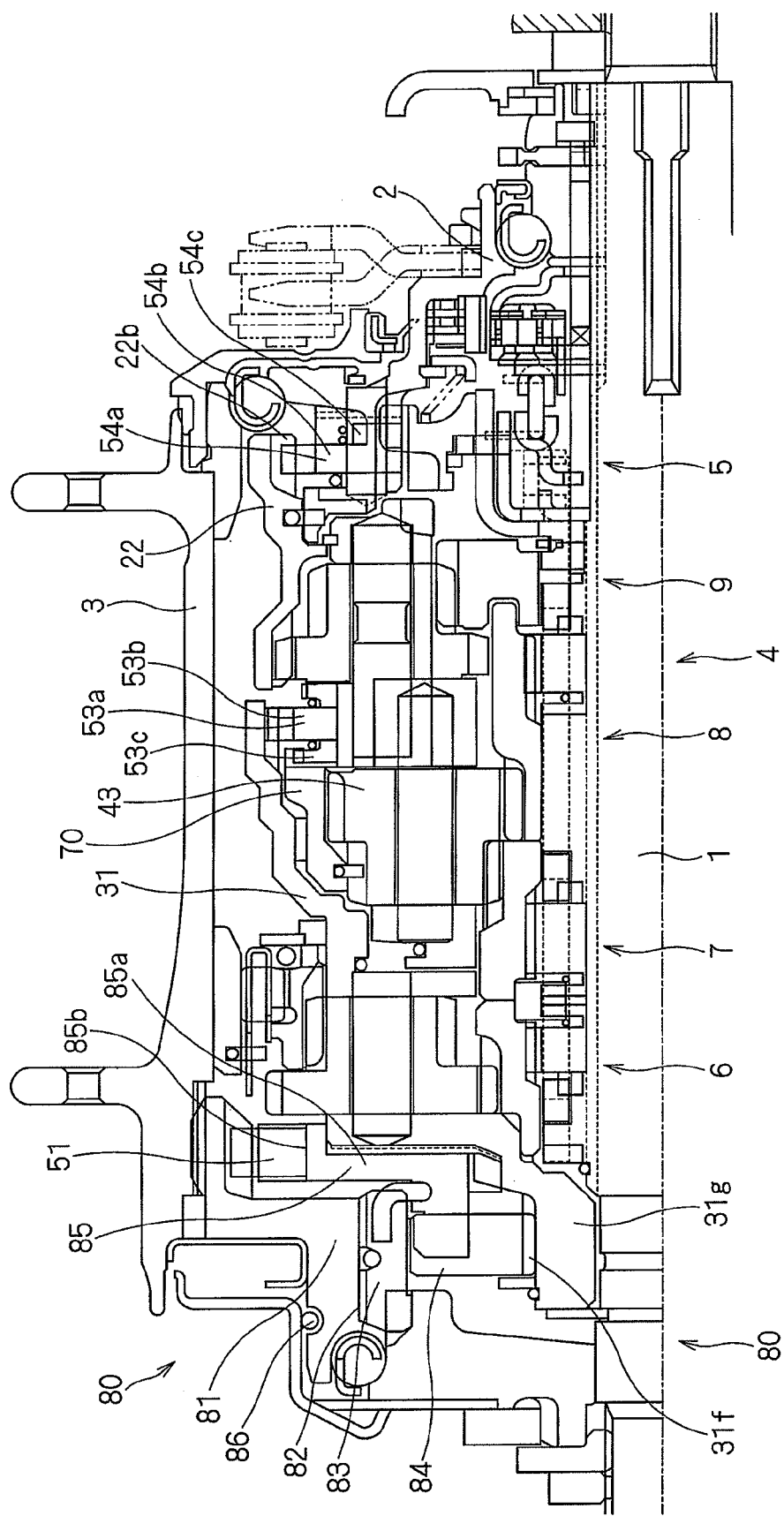
FIG. 14 is a longitudinal cross sectional view of a hub transmission according to a further embodiment.

The further embodiment according to FIG. 14 corresponds to the embodiment according to FIG. 13 except for the third clutch 53a which is replaced with an arrangement comprising a linking member 70 and a one way clutch 53.

The function of the linking member 70 is to control the driving pawls of the third clutch 53, to control the braking pawls 53c between the linking member 70 and the third planetary gear carrier 33 and to transmit a braking rotation (reverse rotation) from the third planetary gear carrier 33 to the first planetary gear carrier 31. Thus, the linking member 70 controls to bring up or bring down the driving pawls and the braking pawls which are responsible for the forward or reverse rotation of the first planetary gear carrier 31. The linking member 70 has the form of a ring gear which meshes with the planetary gears 43 of the third planetary gear mechanism 8 without play and connects with the first planetary gear carrier 31 with play. Thus, the linking member 70 and the first planetary gear carrier 31 can rotate relative to each other within the predetermined play. A more detailed description of the linking member 70 is contained in EP Patent Publication No. 06 008 957 which is assigned to Shimano, Inc.

The embodiment according to FIG. 14 functions as follows:

If the driver 2 rotates in a reverse or backward direction, the third planetary gear carrier 33 also rotates in a backward direction. Then, the linking member 70 rotates relative to the first planetary gear carrier 31 within the play in a reverse direction. Then, the driving pawls 53 will take the inner teeth of the first planetary gear carrier 31 with the result that a reverse rotational force is transmitted from the third planetary gear carrier 33 to the first planetary gear carrier 31 via the braking pawls 53c of the third clutch 53. Therefore, in all speed stages, the transmission path of the reverse rotation force is the same path with the result that the brake power (torque) is always constant.

As regards the forward rotation the hub transmission is in a driving stage, it should be noted that, if the driver 2 rotates in a forward direction, the third planetary gear carrier 33 also rotates in a forward direction. In the first, the second and the seventh speed stage, the forward rotational force is transmitted from the third planetary gear carrier 33 to the first planetary gear carrier 31 via the driving pawls 53b of the third clutch 53. Thus, the first planetary gear carrier 31 rotates with the same speed as the linking member 70 in a forward direction.

In the other speed stages, the forward rotational force is transmitted from the third planetary gear carrier 33 to the first planetary gear carrier 31 via the second or the third planetary gear mechanisms 7, 8 and the linking member 70. In these speed stages, the first planetary gear carrier 31 rotates faster than the linking member 70 in a forward direction. In this case, the linking member 70 rotates relatively to the planetary gear carrier 31 within the play in the forward direction.

Figure 16:
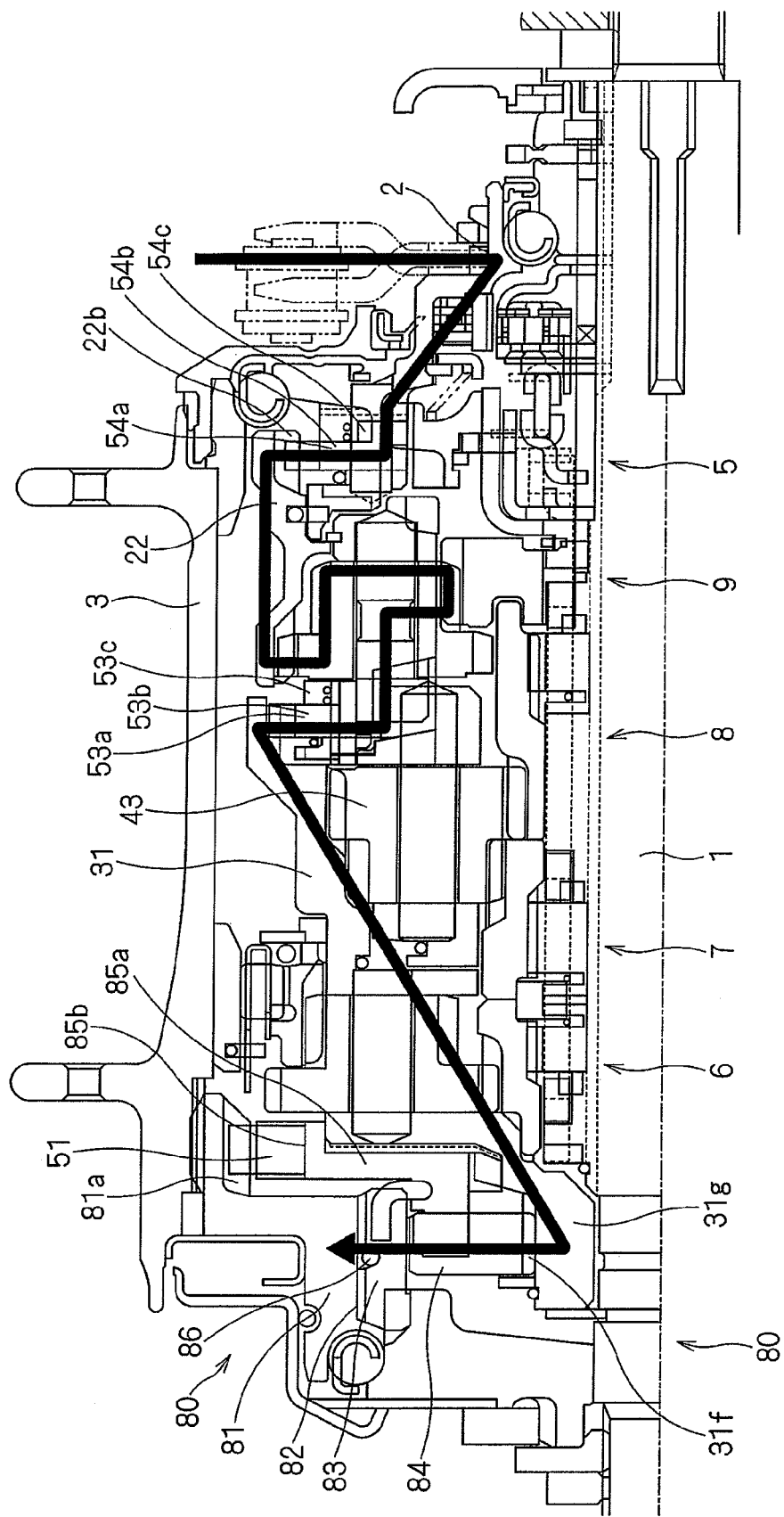
FIG. 16 is a view of the hub transmission according to FIG. 13 with the braking torque path through the hub transmission being illustrated.
Figure 17:
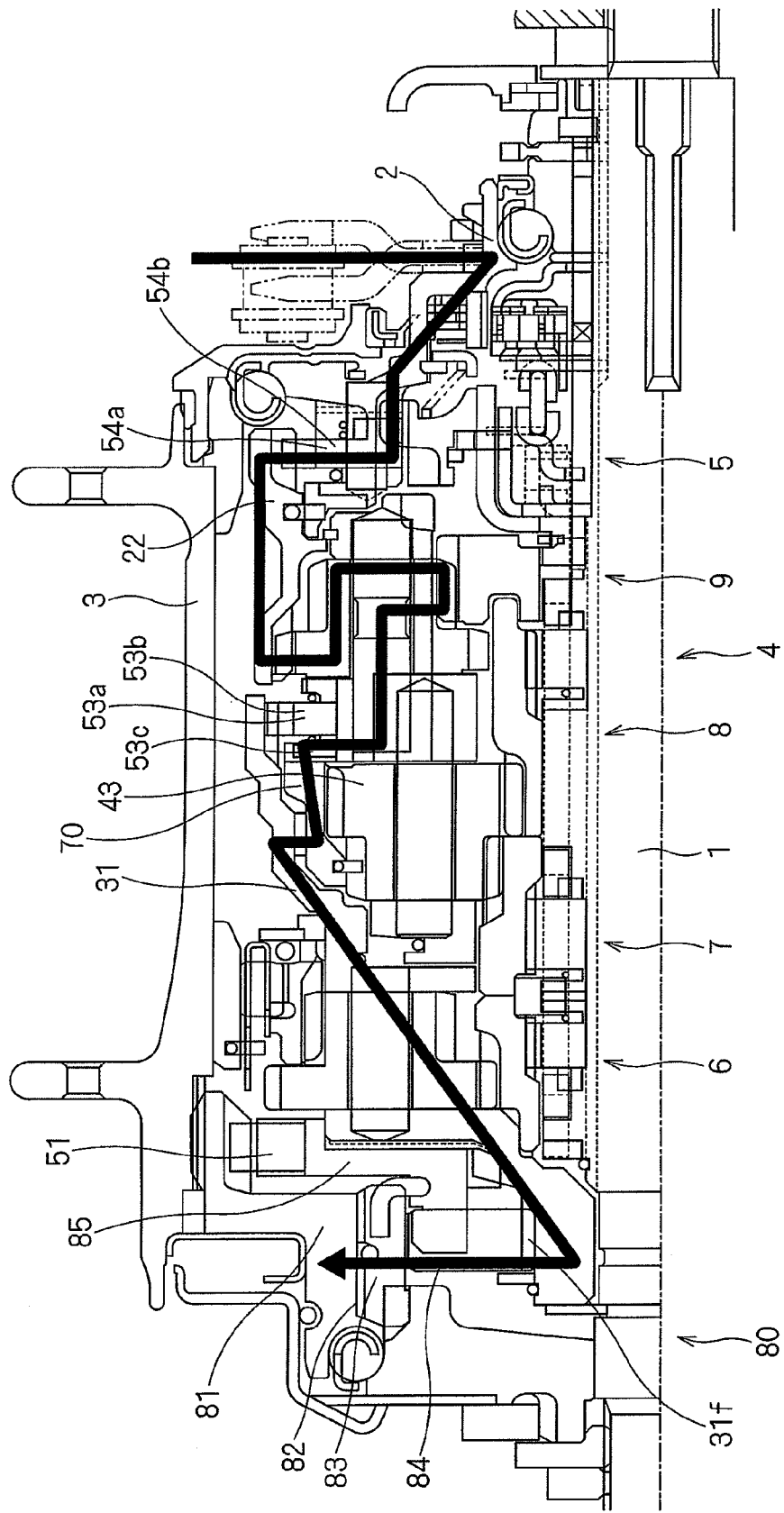
FIG. 17 is a view of the hub transmission according to FIG. 14 with the braking torque path through the hub transmission being illustrated.

The braking torque path in the embodiment according to FIG. 13 is indicated by the arrow in FIG. 16 and comprises the following elements: the driver 2—the braking pawl 54c of the fourth clutch 54a—the second ring gear 22—(the fourth planetary gears 44 rotate around the fourth sun gear 14)—the third planetary gear carrier 33—the braking pawls 53c of the third clutch 53a—the first planetary gear carrier 31—the control elements (brake rollers) 84—the braking element (brake shoe) 83—the braking surface 82—the cup 81—the hub shell 3.

The braking path (reverse rotation path) of the embodiment according to FIG. 14 comprises the following elements: the driver 2—the braking pawl 54c of the fourth clutch 54a—the second ring gear 22—(the fourth planetary gears 44 rotate around the fourth sun gear 14)—the third planetary gear carrier 33—the braking pawls 53c of the third clutch 53—the linking member 70—the first planetary gear carrier 31 the control elements (brake rollers) 84—the braking elements (brake shoes) 83—the braking surface 82—the cup 81—the hub shell 3.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle hub transmission comprising:
a hub axle;
a driver rotatably supported relative to the hub axle;
a hub shell rotatably supported relative to the driver,
a power transmission mechanism including a downstream planetary gear unit and an upstream planetary gear unit, which are operatively disposed between the driver and the hub shell to selectively transmit rotational power from the driver to the hub shell through one a plurality of power transmission paths; and
a shift mechanism operatively coupled to the power transmission mechanism to selecting one of the power transmission paths,
the downstream planetary gear unit including a planetary gear carrier that meshes with planetary gears of the upstream planetary gear unit or with a linking member which is coupled to the planetary gears of the upstream planetary gear unit, and the planetary gear carrier of the downstream planetary gear unit being coupled with a brake unit disposed within the hub shell to transmit a reverse rotational power from the driver to the brake unit, the planetary gear carrier of the downstream planetary gear unit includes a carrier portion and a ring gear portion which meshes with the planetary gears of the upstream planetary gear unit or with the linking member, which is coupled with the planetary gears of the upstream planetary gear mechanism, with the carrier portion and the ring gear portion being non-rotatably connected as a unit.

2. The bicycle hub transmission according to claim 1, wherein
the downstream planetary gear unit and the upstream planetary gear unit form at least four planetary gear mechanisms arranged in series.

3. The bicycle hub transmission according to claim 1, wherein
the upstream planetary gear unit constitutes at least second, third and fourth planetary gear mechanisms.

4. The bicycle hub transmission according to claim 3, wherein
the downstream planetary gear unit and the third gear mechanism include the planetary gears of the upstream planetary gear unit.

5. The bicycle hub transmission according to claim 3, wherein
the planetary gear carrier of the downstream planetary gear unit is selectively connectable with the fourth planetary gear mechanism.

6. The bicycle hub transmission according to claim 5, wherein
the planetary gear carrier of the downstream planetary gear unit includes a clutch engaging portion which is selectively connectable with a planetary gear carrier of the fourth planetary gear mechanism.

7. The bicycle hub transmission according to claim 1, wherein
the planetary gear carrier of the downstream planetary gear unit is selectively connectable with the hub shell by a first clutch to transmit a rotational force from the planetary gear carrier to the hub shell.

8. The bicycle hub transmission according to claim 7, wherein
the brake unit includes a cup which is non-rotatably connected with the hub shell and forms a circumferentially disposed braking surface, a plurality of brake elements arranged to co-operate with the braking surface to apply a braking torque, and a plurality of control elements to actuate the brake elements, with the control elements being coupled with the planetary gear carrier of the downstream planetary gear unit such that an actuation of the brake elements is effected by a reverse rotation of the planetary gear carrier of the downstream planetary gear unit.

9. The bicycle hub transmission according to claim 8, wherein
the first clutch is disposed between the cup and the planetary gear carrier of the downstream planetary gear unit.

10. The bicycle hub transmission according to claim 8, wherein
the first clutch is supported by a retaining element of the control elements.

11. The bicycle hub transmission according to claim 10, wherein
the control elements includes a plurality of rollers which co-operate with a plurality of cam surfaces provided on the planetary gear carrier of the downstream planetary gear unit, and
the retaining element includes a roller cage supporting the rollers with the roller cage being engaged with the planetary gear carrier of the downstream planetary gear unit.

12. A bicycle hub transmission comprising:
a hub axle;
a driver rotatably supported relative to the hub axle;
a hub shell rotatably supported relative to the driver;
a power transmission mechanism including a downstream planetary gear unit and an upstream planetary gear unit, which are operatively disposed between the driver and the hub shell to selectively transmit rotational power from the driver to the hub shell through one a plurality of power transmission paths; and
a shift mechanism operatively coupled to the power transmission mechanism to selecting one of the power transmission paths,
the downstream planetary gear unit including a planetary gear carrier that meshes with planetary gears of the upstream planetary gear unit or with a linking member which is coupled to the planetary gears of the upstream planetary gear unit, and the planetary gear carrier of the downstream planetary gear unit being coupled with a brake unit to transmit a reverse rotational power from the driver to the brake unit,
the downstream planetary gear unit constituting at least a first planetary gear mechanism including a first sun gear, a first ring gear and a plurality of first planetary gears, with the first sun gear being rotatably supported by the hub axle and selectively lockable with the hub axle, the first ring gear being coaxially arranged with the first sun gear, and the first planetary gears meshing with the first sun gear and the first ring gear, the first planetary gears being rotatably supported by the planetary gear carrier of the first planetary gear mechanism, the first ring gear being selectively connectable with the hub shell by a second clutch for transmitting a rotational force from the first ring gear to the hub shell,
the upstream planetary gear unit constituting at least second, third and fourth planetary gear mechanisms, the second planetary gear mechanism includes a second sun gear, a second planetary gear carrier and a plurality of second planetary gears, with the second sun gear being rotatably supported by the hub axle and selectively lockable with the hub axle, the second planetary gear carrier being rotatably supported by the second planetary gear carrier and meshing with the second sun gear.

13. The bicycle hub transmission according to claim 12, wherein
the third planetary gear mechanism includes a third sun gear rotatably supported by the hub axle and selectively lockable with the hub axle, with the planetary gears being rotatably supported by the second planetary gear carrier and meshed with the third sun gear.

14. The bicycle hub transmission according to claim 13, wherein
the planetary gear carrier of the third planetary gear mechanism and the second planetary gears of the second planetary gear mechanism are non-rotatably connected as a unit to form stepped planetary gears respectively.

15. The bicycle hub transmission according to claim 14, wherein
the fourth planetary gear mechanism includes a fourth sun gear, a second ring gear and a plurality of fourth planetary gears, with the fourth sun gear being non-rotatably fixed to the hub axle, the second ring gear being coaxially arranged with the fourth sun gear, and the fourth planetary gears being rotatably supported by a third planetary gear carrier and meshing with the fourth sun gear and the second ring gear.

16. The bicycle hub transmission according to claim 15, wherein
the third planetary gear carrier engages with the second planetary gear carrier.

17. The bicycle hub transmission according to claim 15, further comprising
a third clutch is disposed between the third planetary gear carrier and the first planetary gear carrier, with clutch engaging portion arranged to selectively transmit a rotational force from the third planetary gear carrier to the first planetary gear carrier.

18. The bicycle hub transmission according to claim 17, further comprising
a fourth clutch is disposed between the driver and the second ring gear to selectively transmit a rotational force from the driver to the second ring gear.

19. The bicycle hub transmission according to claim 18, further comprising
a fifth clutch is disposed between the driver and the third planetary gear carrier to selectively transmit a rotational force from the driver to the third planetary gear carrier.

20. The bicycle hub transmission according to claim 18, wherein
the fourth clutch includes a plurality of driving pawls and a plurality of braking pawls which are arranged to be selectively activated by a forward or reverse rotation of the driver to rotate the second ring gear in a forward or reverse direction.

21. The bicycle hub transmission according to claim 17, wherein
the third clutch includes a plurality of driving pawls and a plurality of braking pawls which are arranged to be selectively activated by a forward or reverse rotation of the third planetary gear carrier to rotate the first planetary gear carrier in a forward or reverse direction.

22. The bicycle hub transmission according to claim 17, wherein
the third clutch includes a plurality of driving pawls, and
the linking member includes a plurality of braking pawls, with the third clutch and the linking member being coupled such that the driving pawls of the third clutch are disengaged and the braking pawls of the linking member are engaged by a reverse rotation of the third planetary gear carrier.

* * * * *